United States Patent
Roeland et al.

(10) Patent No.: US 12,114,222 B2
(45) Date of Patent: Oct. 8, 2024

(54) METHOD AND APPARATUS FOR SWITCHING UPFs

(71) Applicant: Telefonaktiebolaget LM Ericsson (publ), Stockholm (SE)

(72) Inventors: Dinand Roeland, Sollentuna (SE); Göran Eriksson, Norrtälje (SE); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 507 days.

(21) Appl. No.: 17/437,611

(22) PCT Filed: Mar. 15, 2019

(86) PCT No.: PCT/SE2019/050235
§ 371 (c)(1),
(2) Date: Sep. 9, 2021

(87) PCT Pub. No.: WO2020/190180
PCT Pub. Date: Sep. 24, 2020

(65) Prior Publication Data
US 2022/0191763 A1    Jun. 16, 2022

(51) Int. Cl.
*H04W 36/32* (2009.01)
*H04W 36/00* (2009.01)
*H04W 76/15* (2018.01)

(52) U.S. Cl.
CPC ..... *H04W 36/32* (2013.01); *H04W 36/00837* (2018.08); *H04W 76/15* (2018.02)

(58) Field of Classification Search
CPC ................ H04W 36/32; H04W 76/15; H04W 36/00837
See application file for complete search history.

(56) References Cited

U.S. PATENT DOCUMENTS

| 11,871,291 B2* | 1/2024 | Shan | H04W 36/0055 |
| 2018/0176325 A1* | 6/2018 | Liang | H04L 67/568 |

(Continued)

OTHER PUBLICATIONS

International Search Report and Written Opinion dated Oct. 24, 2021 for International Application No. PCT/SE2019/050235 filed Mar. 15, 2019, consisting of 10-pages.

(Continued)

*Primary Examiner* — Chi H Pham
*Assistant Examiner* — Weibin Huang
(74) *Attorney, Agent, or Firm* — Weisberg I.P. Law, P.A.

(57) ABSTRACT

A method performed by a core network node of a wireless communications network having a first gNB and a second gNB, a wireless device, WD, is connected to the first gNB, and a first Packet Data Unit, PDU, session is established between the WD and a Data Network over a first User Plane Function, UPF. The method includes obtaining information regarding a predicted positional change indicating a new future position of the WD and selecting a second UPF which is more suitable than the first UPF for transmission of data between an application server and the WD for the new future position. The method includes triggering establishment of the second PDU session over the second UPF, and in response to the triggering establishment of the second PDU session over the second UPF, triggering a first move of packet flows from the first PDU session to the second PDU session.

14 Claims, 14 Drawing Sheets

(56) References Cited

U.S. PATENT DOCUMENTS

2019/0387440 A1* 12/2019 Yiu .................... H04W 36/362
2020/0259878 A1*  8/2020 Yang ................... H04W 4/029
2022/0124870 A1*  4/2022 Bharatia .............. H04W 76/11

OTHER PUBLICATIONS

3GPP TR 23.791 V16.0.0; 3rd Generation Partnership Project; Technical Specification Group Services and System Aspects; Study of Enablers for Network Automation for 5G (Release 16), Dec. 2018, consisting of 121-pages.

3GPP TSG-SA WG2 Meeting #130 S2-1900951 (revision of S2-1900650); Title: Use of analytics for user plane function selection; Source to WG: Nokia, Nokia Shanghai Bell, AT&T, Ericsson, Convida Wireless, NEC; Source to TSG: S2; Work Item Code: eNA; Date and Location: Jan. 21-25, 2019, Kochi, India, consisting of 5-pages.

SA WG2 Meeting #129bis S2-1812797 (was S2-1812370); Title: Overall evaluation and conclusion of key issue 6 for NWDAF assisting traffic routing; Agenda item: 6.11; Source: Ericsson, Nokia, Nokia Shanghai Bell; Work Item / Release: FS_eNA/Rel-16; Document for: Discussion/Approval; Date and Location: Nov. 26-30, 2018, West Palm Beach, USA, consisting of 8-pages.

* cited by examiner

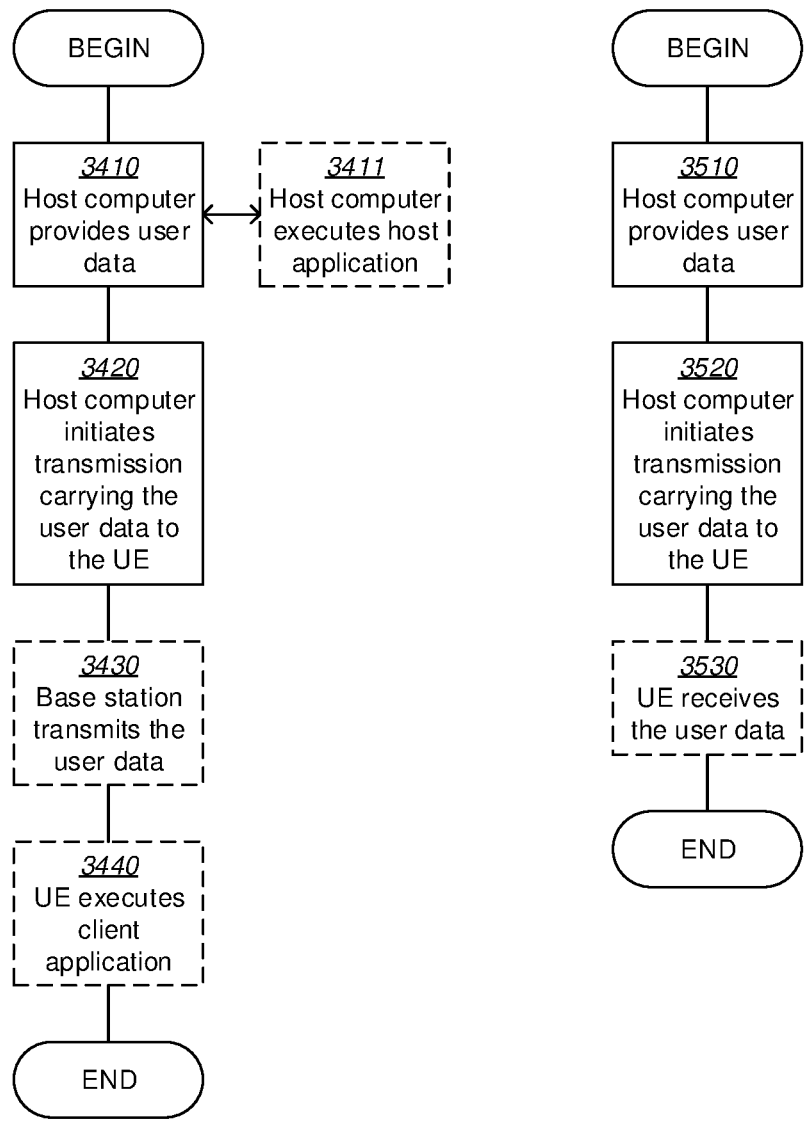

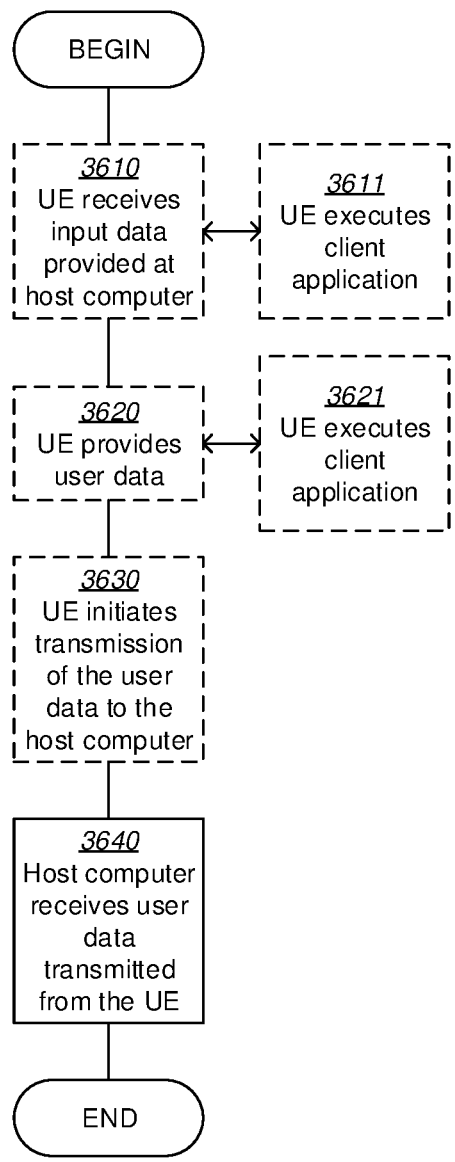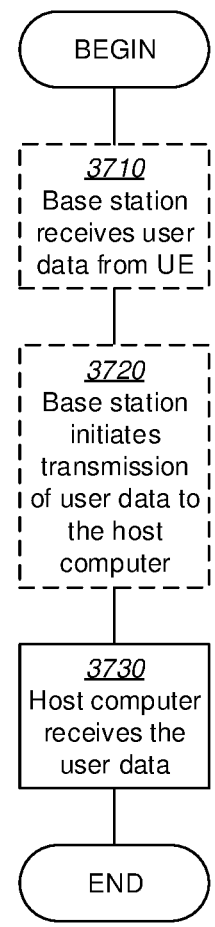
Fig. 17
Fig. 18

METHOD AND APPARATUS FOR SWITCHING UPFs

CROSS-REFERENCE TO RELATED APPLICATIONS

This application is a Submission Under 35 U.S.C. § 371 for U.S. National Stage Patent Application of International Application Number: PCT/SE2019/050235, filed Mar. 15, 2019 entitled "METHODS AND APPARATUSES FOR SWITCHING USER PLANE FUNCTIONS," the entirety of which is incorporated herein by reference.

TECHNICAL FIELD

The present disclosure relates generally to methods and network nodes of a wireless communications network, for switching between UPFs. More specifically, it relates to establishing a new PDU session over a new UPF based on a predicted new future position of a wireless device, and then moving packet flows from the old PDU session to the new PDU sessions. The present disclosure further relates to computer programs and carries corresponding to the above methods and nodes.

BACKGROUND

A wireless communications network comprises a radio access network (RAN) and a core network. The RAN is the part of the wireless communications network that handles wireless connections of wireless communication devices, aka wireless devices, WDs 150, to the wireless communications network via a plurality of radio access network nodes, aka base stations. The core network is the part of the wireless communications network that connects the RAN to data networks, e.g. the Internet or enterprise networks. The core network is e.g. responsible for forwarding packets between the wireless devices and the data networks, for charging, legal intercept, Quality of Service (QoS) management, and for policy control etc.

In order to enable data transmission between a wireless device and an application, a PDU session between the WD and a data network containing the application server for the application may be used, wherein such a PDU session is over a User Plane Function, UPF, which is suitable given the location of the WD. However, as the WD moves, the UPF which is most suitable for providing transmission of data between the WD and the AS may change. When the most suitable UPF changes, there needs to be a re-configuration of the network, including e.g. setup of tunnels and (re)configuration of nodes involved.

In edge deployments, i.e. in deployments that facilitate data processing at or near the source of data generation, re-configuration may involve steps such as changing UPF and state relocation between UPFs. This involves buffering of messages, resolving out-of-order packet delivery, and similar issues. It would be beneficial to simplify this procedure.

SUMMARY

It is an object of the invention to address at least some of the problems and issues outlined above. An object of embodiments of the invention is to enable improved performance of wireless devices, especially during application level handovers. It is possible to achieve these objects and others by using a method and an apparatus as defined in the attached independent claims.

According to one aspect, a method is provided for switching UPFs is provided, performed by a core network node of a wireless communications network, the wireless communications network comprising a first gNB and a second gNB, wherein a wireless device is connected to the wireless communications network. There is a first Packet Data Unit, PDU, session established between the WD and a Data Network, DN, over a first User Plane Function, UPF, wherein the DN comprises an application server, AS. The method comprises obtaining information regarding a predicted positional change of the WD indicating a new future position of the WD, and selecting a second UPF which is more suitable than the first UPF for transmission of data between the application server and the WD for the new future position. The method further comprises triggering establishment of the second PDU session over the second UPF, and in response to the triggering establishment of the second PDU session over the second UPF, triggering a first move of packet flows from the first PDU session to the second PDU session.

According to another aspect, a method is provided for switching UPFs is provided, performed by a wireless device of a wireless communications network. The wireless communications network comprises a core network node, a first gNB and a second gNB, wherein a wireless device is connected to the wireless communications network. There is a first Packet Data Unit, PDU, session established between the WD and a Data Network, DN, over a first User Plane Function, UPF, wherein the DN comprises an application server, AS. The method comprises receiving an instruction to establish a second PDU session between the WD and the DN over a second UPF, wherein the instruction is received in response to a predicted positional change of the WD indicating a new future position in which the second UPF is more suitable than the first UPF for transmission of data between the AS and the WD. The method further comprises, in response to the receiving, establishing the second PDU session over the second UPF between the WD and the DN, and in response to the establishing the second PDU session over the second UPF between the WD and the DN initiating a first move of packet flows from the first PDU session over the first UPF to the second PDU session over the second UPF.

According to another aspect, a method is provided for switching UPFs, performed by an application server in a wireless communications network. The wireless communications network comprises a core network node, a first gNB and a second gNB, wherein a wireless device is connected to the wireless communications network. There is a first Packet Data Unit, PDU, session established between the WD and a Data Network, DN, over a first User Plane Function, UPF, wherein the DN comprises the application server. The method comprises subscribing to information regarding predicted positional changes of the WD, and receiving an indication that a second PDU session has been established between the DN and the WD over the second UPF, wherein the second PDU session is received in response to a predicted positional change of the WD indicating a new future position in which the second UPF is more suitable than the first UPF for transmission of data between the AS and the WD. The method further comprises, in response to the receiving an indication that a second PDU session has been established between the DN and the WD over the second UPF, initiating a first move of packet flows from the first PDU session over the first UPF to the second PDU session over the second UPF.

According to another aspect, a method is provided for switching UPFs, performed by a first gNB of a wireless communications network. The wireless communications network further comprises a core network node and a second gNB, wherein a wireless device is connected to the wireless communications network. There is a first Packet Data Unit, PDU, session established between the WD and a Data Network, DN, over a first User Plane Function, UPF, wherein the DN comprises an application server. The method comprises receiving a request for establishing a second PDU session over a second UPF, based on the predicted new position of the WD and obtaining an indication that the second PDU session should be established via the most suitable gNB for the second UPF. The method further comprises, based on the received indication and the received request, ensuring that the second PDU session is established via the second gNB.

According to other aspects, computer programs and carriers are also provided, the details of which will be described in the claims and the detailed description.

The above method and apparatus may be configured and implemented according to different optional embodiments. In one possible embodiment, . . . .

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIGS. 15 to 18 are flowcharts illustrating methods implemented in a communications network including a host computer, a wireless network node and a wireless device.

DETAILED DESCRIPTION

Briefly described, a solution is provided for preparing for a mobility event of a Wireless Device, WD, before the mobility event actually occurs. This is enabled by having information regarding a future trajectory of a WD, wherein the trajectory of the WD details predicted positions at specific future points in time. By informing both the WD and an application server, AS, of a Data Network, DN, to which the WD is connected, about an upcoming mobility event of the WD, it is possible to prepare for this mobility event by establishing a new PDU session over a new User Plane Function, UPF, which is more suitable for a new predicted position for the WD, than a UPF which is currently being used for communication between the WD and the AS. When the new PDU session has been established, there will be a period of time in which there are two PDU sessions active, wherein the application and/or WD can prepare to move packet flows from the old session to the new session.

Figure 1:
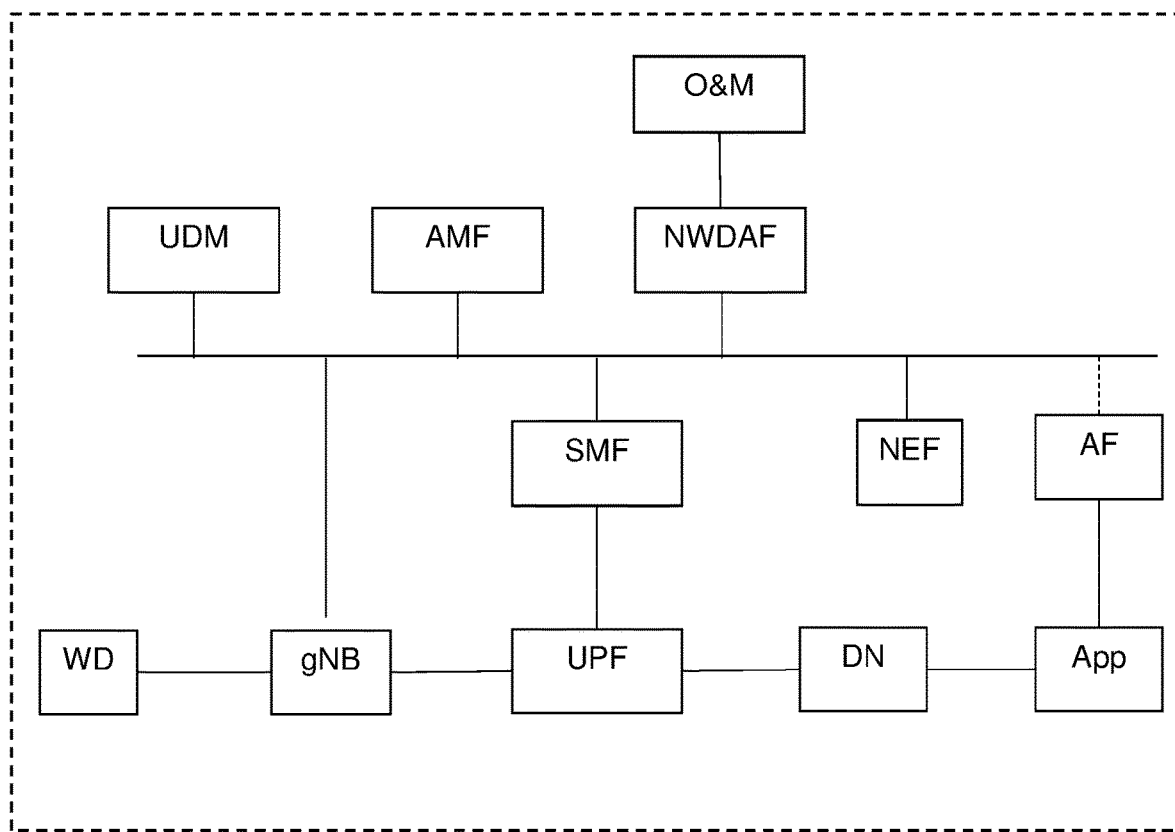
FIG. 1 is a view of a network architecture.

FIG. 1 shows an example of an architecture a communications network in which embodiments of the present disclosure may be implemented, which is preferably a 5G system architecture. The names of the nodes represented in the figure will now briefly be described, and throughout this document the functionalities of the nodes can be assumed have at least the functions defined in TS 23.501, unless otherwise specified, and may have additional functionalities. The network comprises a core network comprising an Operations & Management, O&M, node, a Unified Data Management, UDM, node, an Application and Mobility Management Function, AMF, node, a Networks Data Analytics Function, NWDAF, node, a Session Management Function, SMF, node, a Network Exposure Function, NEF, node and an Application Function, AF, node. The network further comprises Radio Access Network, RAN, comprising a base station, which may be a gNB, a User Plane Function, UPF, node, a Data Network, DN, and an Application, wherein a Wireless Device, WD, may be connected to the gNB.

Figure 2:
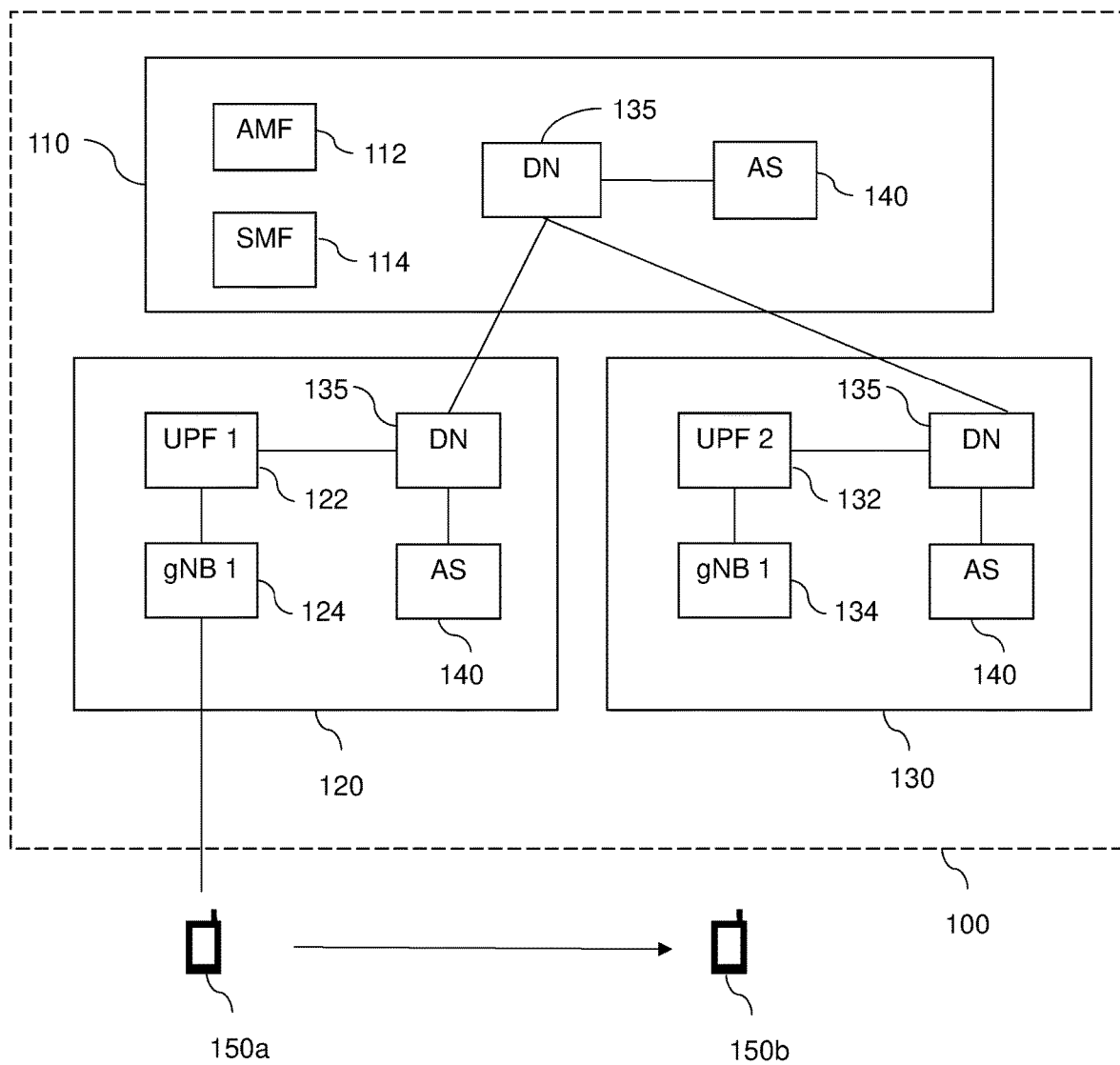
FIG. 2 is a block diagram of a wireless communications network in which the present disclosure may be implemented.

FIG. 2 shows parts of a wireless communications network 100 in which the present disclosure may be implemented. The communications network 100 comprises a central site 110, a first edge site 120 and a second edge site 130. The central site comprises the core network functions of the network, including a Service and Management Function, SMF, and an Application Management Function, AMF, as well as a Data Network, DN, and an Application Server, AS, which is a part of the DN. The edge sites 120, 130 represents geographically different areas, and each edge site comprises a UPF, a gNB, and an instance of the DN, which in turn provides a connection to an instance of the AS. In practice, the AS will likely be deployed as a cloud solution with functionalities spread across different nodes, wherein the instance of the AS on the first edge site 110 employs different resources than the instance of the AS on the second edge site 120, and the same may be true for the DN. However, for the purpose of this application, the AS will in most embodiments be treated as one big application server, and the DN will in most embodiments be treated as one big data network, which provides connectivity between the WD and the AS.

Thus, the central site comprises the AMF 112, the SMF 114, the DN 135, which may be an origin of the DN, and the AS 140, which may be an origin of the AS. The first edge site 120 comprises a first UPF 122, a first gNB 124, the DN 135, which may be a first instance of the DN, and the AS 140, which may be a first instance of the AS. The second edge site has a second UPF 132, a second gNB 134, the DN 135, which may be a second instance of the DN, and the AS 140, which may be a second instance of the AS.

As for the UPFs and the gNBs, the first UPF 122 at the first edge site 120 is a different UPF than the second UPF 132 of the second edge site 130, and the first gNB 124 of the first edge site gNB is a different gNB than the second gNB 134 of the second edge site 130. In some embodiments, the first and second gNB of the first and second edge sites are physically located at different geographic areas. In some embodiments the first and second gNB of the first and second edge sites deploy different resources in a distributed cloud solution. In some embodiments, the first and second UPFs of the first and second edge sites of the first and second site are physically located at different geographic areas. In some embodiments the first and second UPFs of the first and second edge sites deploy different resources in a distributed cloud solution.

A Wireless Device, WD, 150, is connected to the wireless communications network 100. The WD 150 is located at a first position 150a at a first point in time, in which the entities of the first edge site are more suitable than the entities of the second edge site for enabling transmission of data between the WD and the DN, and subsequently for transmission of data between the WD and the AS as well. However, at some point in time the WD will move to a second position 150b, in which the entities of the second edge site are more suitable than the entities of the first edge site for enabling transmission of data between the WD and the DN. The present disclosure provides a way to prepare for the upcoming change in positions of the WD, by using Machine Intelligence, MI, in order to predict a future trajectory of the WD. A future trajectory of the WD comprises predicted information regarding at which positions the WD will be located at during specific points of time in the future. Such a predictive function may be implemented anywhere in the core network, as long as it is able to provide information regarding the predicted trajectory of a WD to the SMF. However, it is assumed that the function will most likely be implemented in the Network Data Analytics Function, NWDAF.

The wireless communications network 100 may be any kind of wireless communications network that can provide wireless communication ability to wireless devices. Example of such wireless communications networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as 5G wireless communications networks based on technology such as New Radio (NR).

The first and second base stations, preferably first and second gNBs 124, 134 may be any kind of radio access network node that provides wireless access to the wireless device 150 alone or in combination with another network node. Other examples of such a radio access network node is a base transceiver station, a BS controller, a network controller, a Node B (NB), an evolved Node B (eNB), a next generation Node B (gNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless device 150, aka wireless communication device, may be any type of device capable of wirelessly communicating with a base station using radio signals. For example, the wireless communication device 150 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 3:
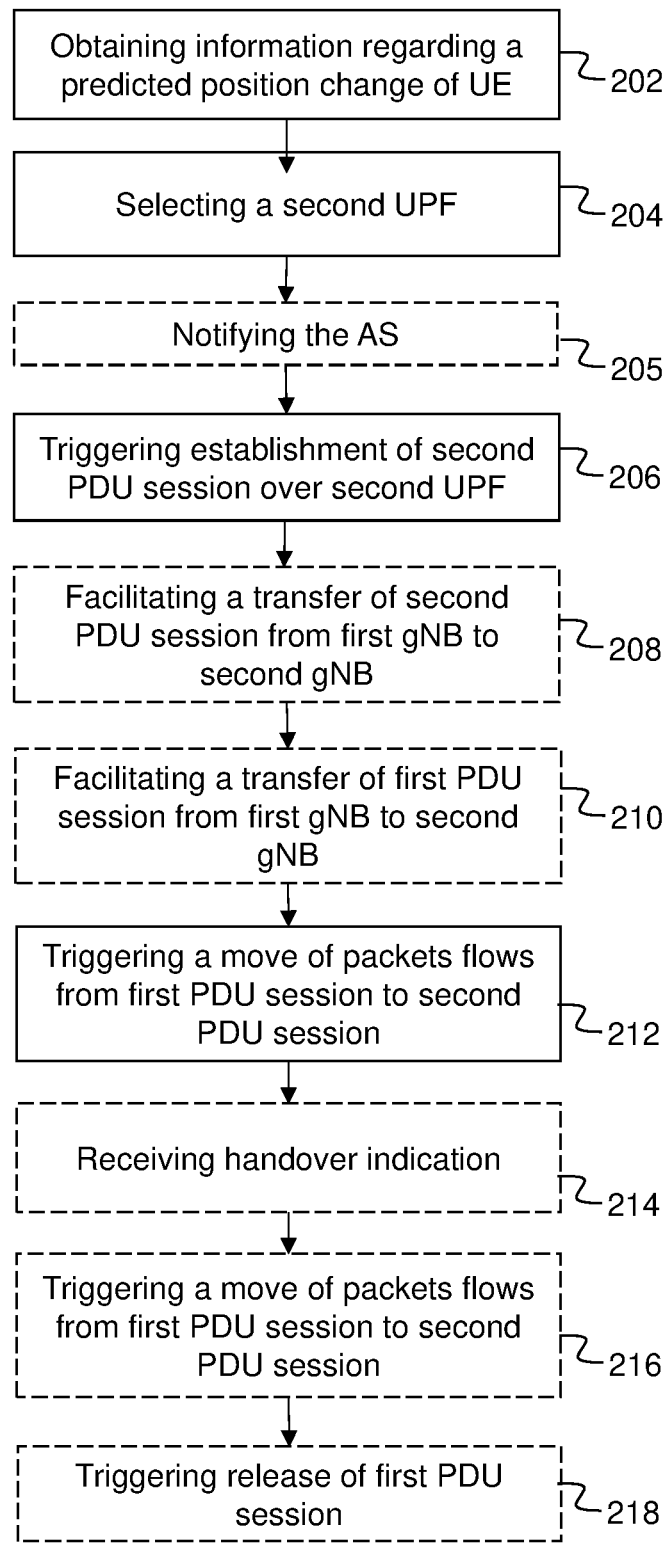
FIG. 3 is a flow chart illustrating a method performed by a core network node, according to possible embodiments

FIG. 3, in conjunction with FIG. 2, describes a first embodiment of a method for switching UPFs, performed by a core network node 600 of a wireless communications network, wherein a WD 150 is connected to the wireless communications network 100. The communications network 100 further comprises a first gNB 124, a second gNB 134, a first UPF 122, a second UPF 132, and a Data Network, DN 135, containing an Application Server, AS 140. The WD is connected to the first gNB 124, and has a first Packet Data Unit, PDU, session established between the WD and the DN 135 over the first UPF 122. In some embodiments, the WD is further connected to the second gNB 134. The method comprises obtaining 202 information regarding a predicted positional change of the WD, indicating a new future position at a future point in time, which may also be expressed as information regarding an updated UE trajectory. The method further comprises selecting 204 the second UPF 132, based on the predicted new future position of the UE, such that the second UPF 132 is more suitable than the first UPF for transmission of data between the AS and the WD for the new future position. The method further comprises triggering 206 establishment of a second PDU session over the second UPF 132, and in response to the triggering establishment of the second PDU session, triggering 212 a first move of packet flows from the first PDU session to the second PDU session. By using information regarding a predicted new position of the WD in order to establish a new PDU session over a new UPF which is more suitable for transmission of data between the AS and the WD, it is possible for the application and the WD to be better prepared, which results in faster and better application level handovers at the time of WD mobility events.

The method may be performed by any core network node with the functionalities required to perform the steps of the method. In some embodiments, the method is performed by a SMF core network node. In some embodiments, the SMF receives updates regarding the WD trajectory, i.e. regarding predicted future positions at specific future points in time, from another core network node, which may be the NWDAF. This entails that the step of obtaining 202 information regarding a predicted positional change of the WD, may comprise obtaining information regarding the predicted positional change from another core network node, which may be the NWDAF. In some embodiments, in order to obtain updates regarding the trajectory of a WD, the SMF may use a subscription function in order to subscribe to any updates in WD trajectory, from the NWDAF. In some embodiments, the step of the SMF subscribing to updates regarding predicted positional changes of the WD may be performed before the step of obtaining 202 information regarding a predicted positional change of the WD indicating a new future position.

In some embodiments, the method further comprises receiving 214 a handover indication, and based on the received handover indication, triggering 216 a second move of packet flows from the first PDU session to the second PDU session. The handover indication is in some embodiments obtained from the RAN, i.e. the first gNB 124 or the second gNB 134, and in some embodiments it may be obtained via the WD 150, however in those embodiments it would also originate from the RAN.

In some embodiments, some but not all of the packet flows may be moved in the first move at step 212, and the remaining flows are moved at the second step 216. In some embodiments, all of the packet flows may be moved at the first move. In some embodiments comprising the second move, all packet flows may be moved at the second move. In some embodiments, low-latency flows may be moved during the first move, and the remaining flows are moved during a second move.

In some embodiments, the information regarding a predicted positional change of the WD 150 indicating a new future position comprises information regarding which geographic position the WD 150 will be located at a specific point in time. In some embodiments, the information regarding a predicted positional change of the WD 150 indicating a new future position comprises information regarding which gNB is most suitable for the WD 150 at a specific point in time. In some embodiments, the information regarding a predicted positional change of the WD 150 indicating a new future position comprises information regarding which UPF is most suitable for the WD 150 at a specific point in time.

In some embodiments, the step of selecting 204 a second UPF which is more suitable than the first UPF for transmission of data between the application server and the WD 150 for the new future position is made only based on the geographic position of the new future position of the WD 150, such that any given position of a WD 150 has a certain UPF which is the most suitable one for that given position. In some embodiments, other conditions may also be taken into account when determining which UPF is the most suitable, such as current load, latency, data rate, cheaper transport, and similar metrics. In some embodiments, the selecting 204 is further based on a name of the DN containing the AS. In some embodiments, the selecting 204 is further based on information related to user plane topology and user plane terminations, which may be deduced from identities provided by the Application Network, AN, such as Cell ID, as well as information regarding available UPFs and Data Network Access Identifier, DNAI, of the DN.

In some embodiments, the step of triggering 206 establishment of a second PDU session over the second UPF 132 comprises instructing the WD 150 to establish the second PDU session over the second UPF 132. In some embodiments, the triggering 206 establishment of a second PDU session over the second UPF 132 comprises instructing the AS to establish the second PDU session over the second UPF 132. In some embodiments, the instruction to establish the second PDU session over the second UPF 132 may be an instruction to establish the second PDU session over a UPF which is geographically closest to the indicated new position of the WD 150, without specifying that it is the second UPF 132. In some embodiments, the instruction to establish the second PDU session over the second UPF 132 may be an instruction to establish the second PDU session over a UPF which has the shortest packet transmission delay.

In some embodiments, triggering 206 establishment of the second PDU session over the second UPF 132 comprises triggering establishment of the second PDU session over the second UPF 132 via the second gNB 134. In some embodiments, this step comprises triggering establishment of the second PDU session directly via the second gNB 134. In some embodiments, this is preceded by a step of the WD 150 connecting to the second gNB 134, prior to the establishment of the second PDU session via the second gNB 134.

In some embodiments, triggering establishment of the second PDU session over the second UPF 132 via the second gNB 134 comprises first triggering establishment of the second PDU session via the first gNB 124, and in response to the triggering establishment of the second PDU session via the first gNB 124, facilitating a transfer of the second PDU session from the first gNB 124 to the second gNB 134. In some embodiments, facilitating a move of the second PDU session comprises instructing the WD 150 or the AS to move the second PDU session from the first gNB 124 to the second gNB 134. In some embodiments, facilitating a transfer of the second PDU session comprises instructing the AS or the WD 150 to move In some embodiments, the method further comprises facilitating a transfer of the first PDU session over the first UPF 122 from the first gNB 124 to the second gNB 134. In some embodiments, facilitating a transfer of the first PDU session from the first gNB 124 to the second gNB 134 occurs in embodiments wherein the WD 150 is not connected to the second gNB 134 prior to the establishment of the second PDU session.

In some embodiments, the triggering establishment of a second PDU session over the second UPF 132 comprises indicating that the second PDU session over the second UPF 132 should be via the gNB which provides a shortest packet transmission latency based on the predicted new position of the WD 150. In some embodiments, the triggering establishment of a second PDU session over the second UPF 132 comprises indicating that the second PDU session over the second UPF 132 should be via the gNB which is geographically closest to the indicated new position of the WD 150. In some embodiments, the triggering establishment of a second PDU session over the second UPF 132 comprises indicating that the second PDU session over the second UPF 132 should be via the gNB which is most suitable for the selected UPF, i.e. for the second UPF 132.

In some embodiments, the step of triggering 212 a first move of packet flows from the first PDU session to the second PDU session comprises instructing the AS or the WD 150 to move packet flows from the first PDU session to the second PDU session. In some embodiments, triggering a move of packet flows comprises triggering a move of future packets being sent between the WD 150 and the AS, such that any new packets are sent over the second UPF 132 rather than over the first UPF 122. In some embodiments, moving the packet flows may be done using MP-TCP or QUIC.

In some embodiments, the obtaining 202 information regarding a predicted positional change of the WD 150 is obtained based on a positional change of the WD 150. Such a positional change of the WD 150 may be any change in position that entails a change of a predicted position at a future point in time. In some embodiments, such a position change comprises a change of direction of the UE. In some embodiments, the obtaining 202 information regarding a predicted positional change of the WD 150 is obtained based on a positional change of the WD 150 related to a predetermined area, such that the WDs 150 trajectory, i.e. predicted positions at future points in time, is updated any time the WD 150 moves in or out of a predetermined area.

In some embodiments, the obtaining 202 information regarding a predicted positional change of the WD 150 is obtained based on a predicted new position related to a predetermined area. For example, the core network node may send an area description to the entity responsible for predicting positions of WDs at future points in time, which in some embodiments is the NWDAF, and then the predicted trajectory of a WD 150 is updated any time the WD 150 moves in to or out from such a predetermined area. In some embodiments, such a predetermined area is an area associated with a specific UPF. In some embodiments, the core network node may request to be notified whenever the WD 150 moves towards another UPF than the UPF which is currently being used for an active PDU session of the WD 150.

In some embodiments, the information regarding a predicted positional change of the WD 150 comprises an ID of the WD 150 and an estimated time of arrival of the WD 150 at a position indicated in the information regarding a predicted positional change of the WD 150. By knowing the time for arrival, it is possible to more accurately plan for the establishment of the second PDU session and the subsequent move of packet flows.

In some embodiments, the information regarding a predicted positional change of the WD 150 is obtained a predetermined time before the positional change is predicted to take place. In some embodiments, the predetermined time may be set such that the next subsequent step of the method should be performed directly or shortly after the information is obtained. In some embodiments, the predetermined time may be set to a predetermined time before the next subsequent step of the method should be performed. In some embodiment, the predetermined time is based on the AS, and will be different for different application servers. In some embodiments, the predetermined time is based on the WD 150. In some embodiments, it may be based on the capabilities of the WD 150. In some embodiments, it may be based on historic data of the WDs 150 movements. In some embodiments, it may be based on the WDs 150 current movement. In some embodiments, the predetermined time may be determined by a machine learning agent, comprising using a closed learning loop in order to optimize the predetermined time for any given application server.

In some embodiments, the method further comprises notifying 205 the application server regarding the upcoming change of UPF, prior to the triggering establishment of a second PDU session over the second UPF 132. In some embodiments, the notifying is done a predetermined time before the step of triggering 206 establishment of the second PDU session. In some embodiments, the notifying is done a predetermined time after obtaining the information regarding the predicted new position of the WD 150. In some embodiment, the predetermined time is based on the AS, and will be different for different application servers. In some embodiments, the predetermined time is based on the WD 150. In some embodiments, it may be based on the capabilities of the WD 150. In some embodiments, it may be based on historic data of the WDs 150 movements. In some embodiments, it may be based on the WDs 150 current movement. In some embodiments, the predetermined time may be determined by a machine learning agent, comprising using a closed learning loop in order to optimize the predetermined time for any given application server In some embodiments, the method further comprises triggering 218 a release of the first PDU session, which is over the first UPF 122. In some embodiments, triggering 218 a release of the first PDU session comprises instructing the WD 150 to release the first PDU session.

In some embodiments, the connection between the WD 150 and the first gNB 124 is released after the second PDU session is established in the second gNB 134.

Figure 4:
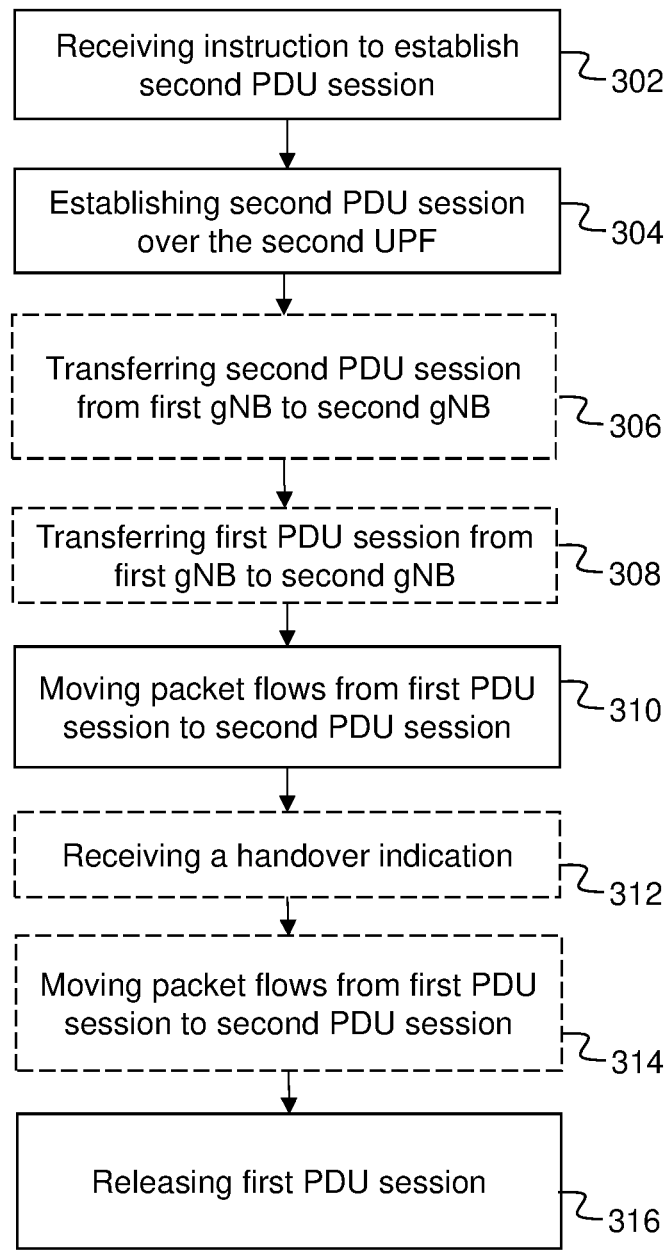
FIG. 4 is a flow chart illustrating a method performed by a wireless device, according to possible embodiments

FIG. 4 describes a second embodiment of a method for switching UPFs, performed by a Wireless device, wherein a WD 150 is connected to a wireless communications network 100. The wireless communications network 100 comprises a core network node, a first gNB 124, a second gNB 134, a first UPF, a second UPF, and a Data Network, DN 135 containing an Application Server, AS 140. The WD 150 is connected to the first gNB 124, and has a first Packet Data Unit, PDU, session established between the WD 150 and the DN 135 over the first UPF 122. In some embodiments, the WD 150 is further connected to the second gNB 134. The method comprises receiving 302 an instruction to establish a second PDU session between the WD 150 and the DN 135, wherein the instruction is received in response to a predicted positional change of the WD 150 indicating a new future position in which the second UPF 132 is more suitable than the first UPF 122 for transmission of data between the AS and the WD 150. The method further comprises establishing 304 the second PDU session over the second UPF 132 between the WD 150 and the DN 135. In some embodiments, the WD 150 simply requests to establish a second PDU session, and the core network ensures that the second PDU session is via the UPF which is most suitable for the predicted new position of the WD 150, i.e. the second UPF 132. The method further comprises, in response to the establishing the second PDU session over the second UPF 132, initiating 310 a move of packet flows from the first PDU session, which is over the first UPF 122, to the second PDU session, which is over the second UPF 132.

In some embodiments, the WD 150 is unaware of that the instruction is received in response to a predicted positional change of the WD 150, it simply receives an instruction to establish a second PDU session without information regarding why it should be established, even though it was a predicted positional change that prompted it.

In some embodiments, the method further comprises receiving 312 and indication of a handover of the WD 150, and, based on the receiving 312 an indication of a handover, moving 314 packet flows from the first PDU session to the second PDU session. In some embodiments, the step of moving 314 packet flows from the first PDU session to the second PDU session is performed after the indication of handover is received. In some embodiment, the step of moving 314 packet flows from the first PDU session to the second PDU session is performed after the handover is completed.

In some embodiments, establishing the second PDU session over the second UPF 132 comprises establishing the second PDU session over the second UPF 132 via the second gNB 134. In some embodiments, establishing the second PDU session over the second UPF 132 via the second gNB 134 comprises first establishing the second PDU session over the second UPF 132 via the first gNB 124, and in response to the establishing the second PDU session over the second UPF 132 via the first gNB 124, transferring the second PDU session from the first gNB 124 to the second gNB 134. In embodiments wherein the second PDU session is established directly in the second gNB 134, the WD 150 is connected to both the first gNB 124 and to the second gNB 134 prior to this step.

In some embodiments, the connection between the WD 150 and the first gNB 124 is released after the second PDU session is established in the second gNB 134.

In some embodiments, when the WD 150 is not connected to the second gNB 134 and the first gNB 124 at the same time, the method may further comprise transferring the first PDU session from the first gNB 124 to the second gNB 134.

In some embodiments, the instruction to establish a second PDU session over the second UPF 132 between the WD 150 and the application server is received a predetermined amount of time before the second PDU session over the second UPF 132 should be established. In some embodiments, the predetermined time may be set such that the next subsequent step of the method should be performed directly or shortly after the information is obtained. In some embodiments, the predetermined time may be set to a predetermined time before the next subsequent step of the method should be performed. In some embodiment, the predetermined time is based on the AS, and will be different for different application servers. In some embodiments, the predetermined time is based on the WD 150. In some embodiments, it may be based on the capabilities of the WD 150. In some embodiments, it may be based on historic data of the WDs 150 movements. In some embodiments, it may be based on the WDs 150 current movement. In some embodiments, the predetermined time may be determined by a machine learning agent, comprising using a closed learning loop in order to optimize the predetermined time for any given application server.

In some embodiments, the instruction to establish a second PDU session over the second UPF 132 between the WD and the application server prompts the WD to establish the second PDU session immediately upon receipt of the instruction. In some embodiments, the instruction may be received a predetermined or a predicted amount of time before handover occurs.

In some embodiments, the method further comprises releasing 316 the first PDU session.

Figure 5:
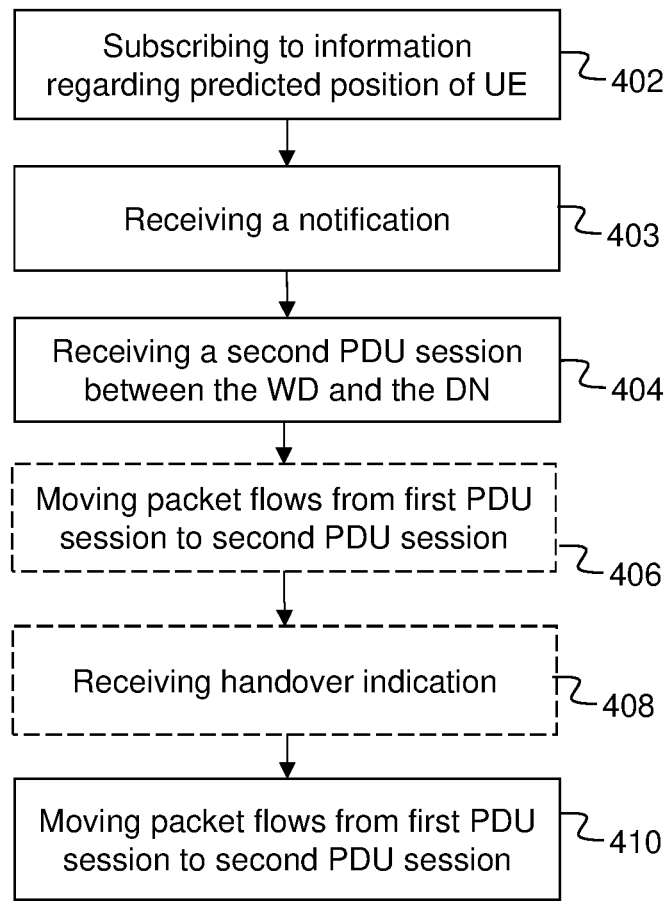
FIG. 5 is a flow chart illustrating a method performed by an application server, according to possible embodiments

FIG. 5 describes a third embodiment of a method for switching UPFs, performed by an Application Server, AS, of a wireless communications network 100, wherein a WD 150 is connected to the wireless communications network. The wireless communications network 100 further comprises a core network node 600, a first gNB 124, a second gNB 134, a first UPF, a second UPF, and a DN containing the AS. The WD 150 is connected to the first gNB 124, and has a first Packet Data Unit, PDU, session established between the WD 150 and the DN 135 over the first UPF 122. The method comprises subscribing 402 to information regarding predicted positional changes of the WD 150. The method further comprises receiving an indication that a second PDU session has been established between the DN 135 and the WD 150 over the second UPF 132, wherein the second PDU session was established in response to a predicted positional change of the WD 150 indicating a new future position in which the second UPF 132 is more suitable than the first UPF 122 for transmission of data between the AS and the WD 150. The method further comprises, in response to receiving the indication that the second PDU session has been established, initiating 406 a first move of packet flows from the first PDU session to the second PDU session.

The step of receiving an indication that the second PDU session has been established may comprise an IP address associated with the second PDU session. In some embodiments, the indication may comprise an identity of the UPF over which the second session is established, i.e. the second UPF 132.

In some embodiments, the step of subscribing 402 comprises subscribing to a core network node, which may be another core network node than the core network node 600. In some embodiments, the core network node which is subscribed to is the NWDAF. In some embodiments, the step of receiving 404 an indication comprises receiving an indication from another core network node, wherein the core network node from which the indication is received may be the SMF.

In some embodiments, the method further comprises receiving 408 an indication of a handover of the WD 150, and based on the received indication, initiating 410 a second move packet flows from the first PDU session to the second PDU session.

In some embodiments, the method further comprises receiving 403 a notification regarding the upcoming change of UPF, prior to the receiving an indication that a second PDU session has been established between the DN 135 and the WD 150 over the second UPF 132.

Figure 6:
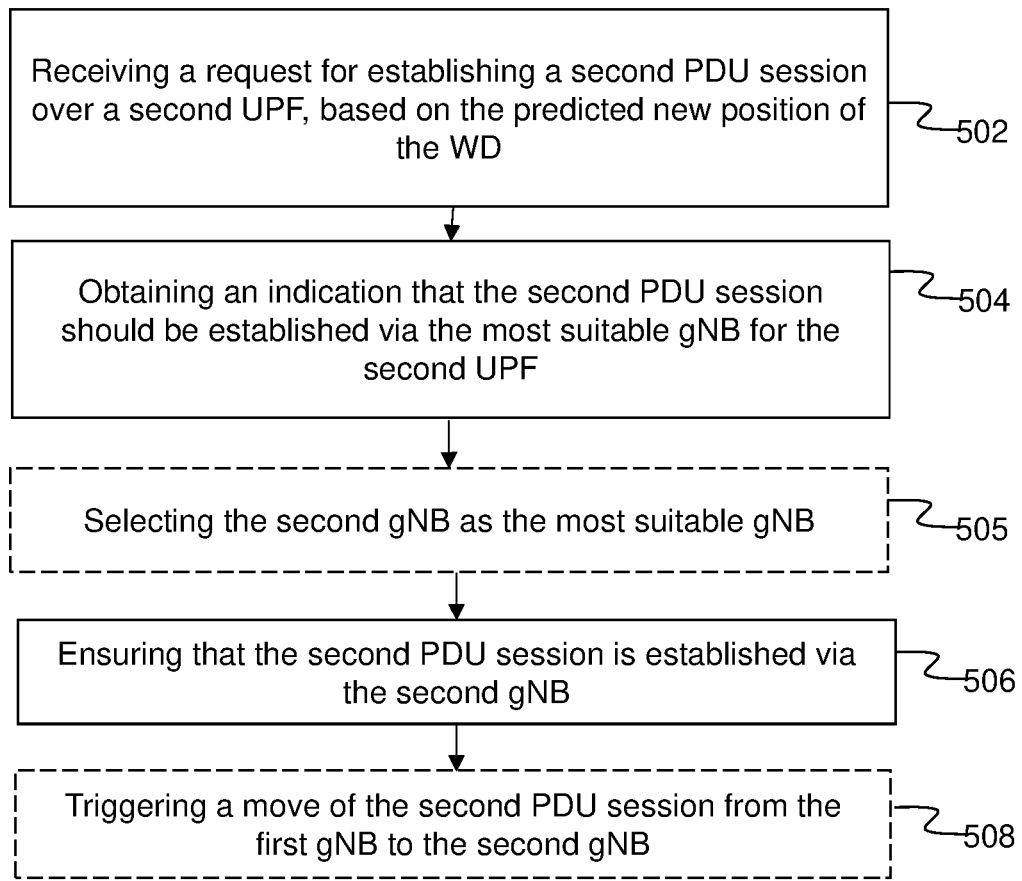
FIG. 6 is a flow chart illustrating a method performed by a base station, preferably a gNB, according to possible embodiments

FIG. 6 describes a fourth embodiment of a method for switching UPFs, performed by a first base station, preferably a first gNB 124, of a wireless communications network 100, wherein a WD 150 is connected to the wireless communications network. The wireless communications network 100 further comprises a core network node 600, a second gNB 134, a first UPF, a second UPF, and a DN containing the AS. The WD 150 is connected to the first gNB 124, and has a first Packet Data Unit, PDU, session established between the WD 150 and the DN 135 over the first UPF 122. The method comprises receiving 502 a request for establishing a second PDU session over a second UPF, based on a predicted new position of the WD 150, and obtaining 504 an indication that the second PDU session should be established via the most suitable gNB for the second UPF. The method further comprises ensuring 506 that the second PDU session is established via the second gNB 134, based on the received indication and the received request.

In some embodiments, the request establishing a second PDU session over the second UPF in a predicted new position of the WD is obtained from a core network node 600, which may be a SMF node. In some embodiments, the indication may be obtained via a policy stored in the RAN, e.g. in the first gNB 124.

In some embodiments, the request may comprise an indication of which UPF to use for the second PDU session, which may be the second UPF 132. In some embodiments, the request may comprise an ID of the UPF to be used for the second PDU session. In some embodiments, the request may comprise an indication that another UPF than the first UPF 122 should be used, but not which specific UPF should be used. In such embodiments, the step of obtaining 504 an indication that the second PDU session should be established via the most suitable gNB for the second UPF may comprise an indication regarding which gNB to use, but no indication regarding which UPF should be used. In such embodiments, the routing of the second PDU session over the second UPF 132 may be handled by other entities in the network, such as the core network node 600, and the first gNB may not be aware of which UPF is used.

In some embodiments, the request received in step 502 and/or the indication received in step 504 comprises only one of an indication regarding which UPF to be used when establishing the second PDU session, and an indication regarding which gNB to be used when establishing the second PDU session, but not the other. In other words, when a UPF is indicated, no gNB is indicated, and when a gNB is indicated, no UPF is indicated.

In some embodiments, wherein the request for establishing a second PDU session over a second UPF comprises an ID or indication regarding which UPF should be used for the second PDU session, the method may further comprise selecting 505 the second gNB as the most suitable gNB for establishing the second PDU session, based on that the second PDU session is most suitable for establishing a PDU session over the second UPF 132. I.e., the first gNB 124 may make a decision regarding which gNB to use for the second PDU session, based on an indication regarding which UPF should be used. The criteria used for selecting which gNB is most suitable may include e.g. which gNB provides the shortest packet transmission delay over the second UPF 132, which gNB is closest to the second UPF 132, which gNB is closest to the predicted new position of the WD, which gNB provides the best signal quality, and similar metrics.

In some embodiments, the indication that the second PDU session should be established via the most suitable gNB for the second UPF comprises an indication regarding which gNB to use for establishing the second PDU session. IN some embodiments, the indication indicates that the second PDU session should be via the gNB which is closest to the predicted new position of the WD. In some embodiments, the indication may be an indication regarding which specific gNB is more suitable for establishing the second PDU session, such as the second gNB 126. In some embodiments, the indication may include an ID of the most suitable gNB, which may be the second gNB 126. In some embodiments, the indication may be an indication that the gNB which provides the shortest packet transmission delay for data transmission between the DN 135 and the WD should be used. In some embodiments, a UPF may be associated with a gNB which is the most suitable gNB for establishing a PDU session over that UPF.

In some embodiments, the method further comprises receiving an instruction for the WD to establish a second PDU session, and forwarding the instruction to the WD. After the WD receives the instruction to establish the second PDU session over the second UPF, the WD sends a request for establishing the second PDU session via the second UPF to the first gNB 124, which is the request received in step 504. The first gNB 124 then ensures that the second PDU session is established via the most suitable gNB, i.e. the second gNB.

In some embodiments, ensuring that the second PDU session is established via the second gNB may comprise either directly establishing resources for the second PDU session over the second UPF via the second gNB, or by establishing resources for the second PDU session in the first gNB 124, and then initiating a move of the second PDU session from via the first gNB 124 to via the second gNB 126. In some embodiments, the step of initiating a move may comprise the first gNB 124 moving the second PDU session, or it may comprise instructing another network node or the WD to move the second PDU session.

Figure 7:
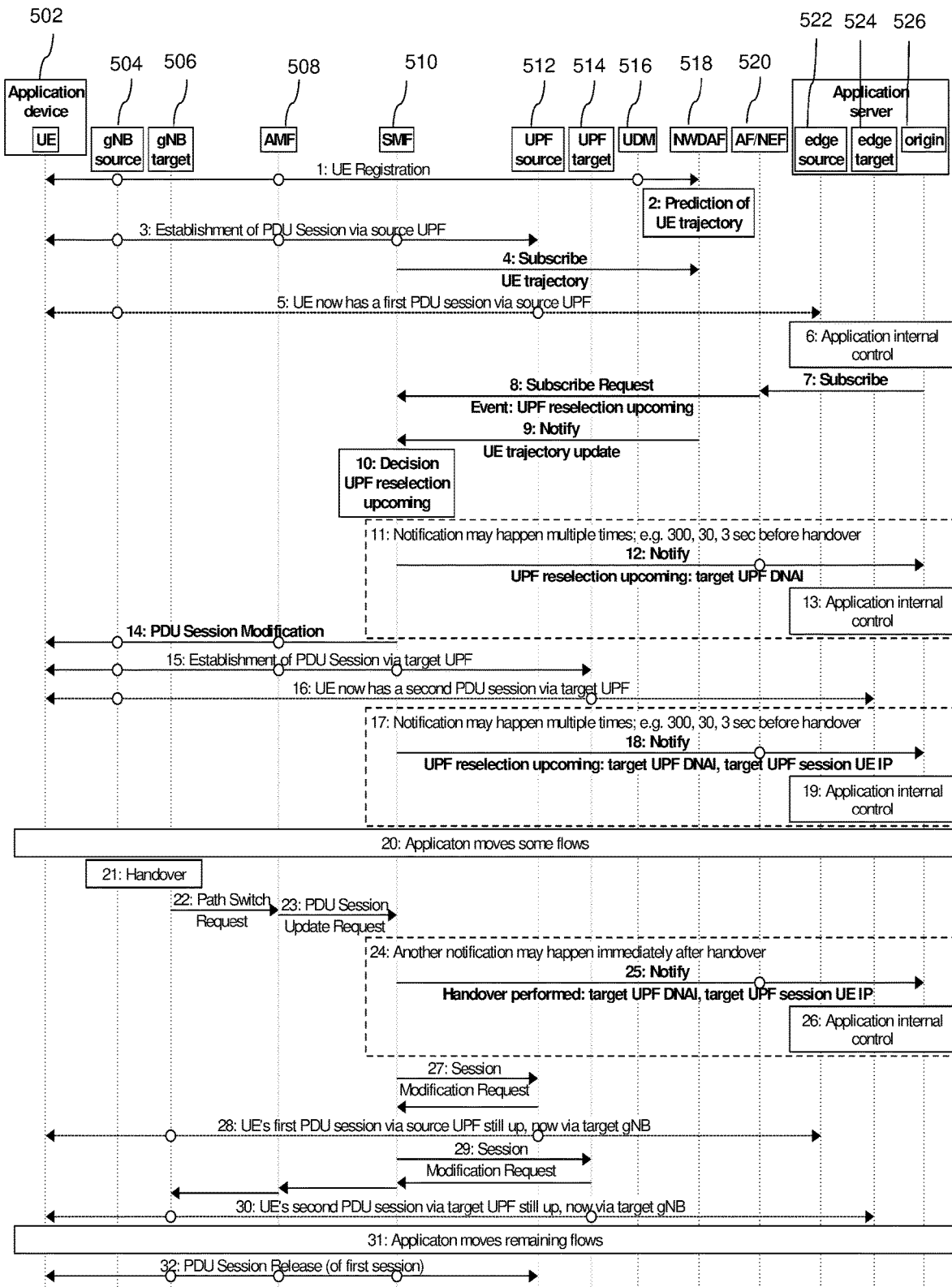
FIG. 7 is a signaling diagram illustrating different embodiments of procedures according to further possible embodiments.

In the following, different embodiments are described. The signaling diagram of FIG. 7 describes details of the first, second, third and fourth embodiments. Observe that the names of the signal sent between the involved nodes are only examples of signal names, other names with similar purposes may also apply. The involved nodes are a WD 502, a source gNB 504, which corresponds to the first gNB 124 of the first embodiment, a target gNB 506, which corresponds to the second gNB 134 of the first embodiment, an AMF 508, a SMF 510, a source UPF 512, which corresponds to the first UPF 122 of the first embodiment, a target UPF 514, which corresponds to the second UPF of the first embodiment, a UDM 516, a NWDAF 518, a AF/NEF 520, and an application server, which corresponds to the application server of the first embodiment, wherein the application server is divided into an AS edge source 522, which is the instance of the AS associated with the source UPF 512, an AS edge target 524, which is the instance of the AS associated with the target UPF 514, and an AS origin 526, which is the instance of the AS associated with the core network.

Prior to the first step of obtaining 202 information regarding a predicted positional change of the WD indicating a new future position, a PDU session is established between the WD and the AS, which is technically a PDU session between the WD and a DN containing the AS. These steps are also part of the signaling diagram of FIG. 5. The method steps of the first embodiment start on step 9 of the signaling diagram, but the previous steps will also be shortly explained.

In step 1 the WD registers to the network, which may be done e.g. as defined in TS 23.502 section 4.2.2. In step 2, the NWDAF starts to predict the trajectory, i.e. predicted future positions at specific future points in time, of the WD. In step 3, the WD establishes a first PDU session as defined in TS 23.502 section 4.3.2 with the DN containing the AS, specifically the AS edge source. In step 4, the SMF subscribes to the NWDAF for updates on the WD trajectory. Such a subscription may comprise an ID of the WD, an area in the form of a list of cell IDs, a flag indicating if the notification shall be sent when moving in to or when moving out from the given area, and a heads-up time, which is a predetermined time before the notification should be sent. In step 5, the WD has an established PDU session which enables data transmission between the WD and the AS, which entails that the WD can communicate with its application peer. In steps 7-8, the AS subscribes to the SMF for UPF reselection events, wherein the UPF reselection events are based on updates of the WD trajectory obtained from the NWDAF. This corresponds to step 402 of the third embodiment. In some embodiments, the AF may subscribe directly to the SMF without using the NEF. In step 9, the NWDAF detects a change in WD trajectory, i.e. an update regarding a predicted positional change of the WD which indicates a new future position, and informs the SMF. The corresponds to step 202 of the first embodiment. Using this information, the SMF can decide that another UPF is more preferred than the current UPF used for the ongoing PDU session, for enabling transmission of data between the WD and the DN containing the AS. In step 10, the SMF makes a decision regarding a reselection of UPF based on the updated WD trajectory, including which should be the target UPF. This corresponds to step 204 of the first embodiment. In step 12, the SMF may notify the AS regarding the upcoming change, corresponding to step 205 of the first embodiment and step 403 of the third embodiment. In step 14, the SMF notifies the WD, and also instructs the WD to establish a second PDU session over the target UPF via the source gNB, which corresponds to step 206 of the first embodiment, and step 302 of the second embodiment. In step 15, the second PDU session is established by the WD over the target UPF, via the source gNB. This corresponds to step 304 of the second embodiment and step 404 of the third embodiment. In step 16, the WD now has a second PDU session established with the DN containing the AS via the target UPF. In steps 17-18, the SMF may again notify the AS regarding upcoming UPF reselection. In some embodiments, this notification may comprise a DNAI of the target UPF, and a target UPF session WD IP address. In step 20, the AS or the WD moves flows from the first PDU session to the second PDU session, which may be based on an instruction from the SMF to do so. This corresponds to step 212 of the first embodiment, step 310 of the second embodiment and step 406 of the third embodiment. In step 21, the WD is handed over from the source gNB to the target gNB. This may be preceded by a step of notifying the SMF regarding the handover, which corresponds to step 214 of the first embodiment, step 312 of the second embodiment and step 408 of the third embodiment. In step 22, the target gNB sends a path switch request to the AMF, which in turn sends a PDU session request to the SMF in step 23. In step 25, another notification may be sent to the AS regarding the handover. Such a notification may comprise a DNAI of the target UPF, and a session WD IP of the target UPF. In step 27, the SMF sends a session modification request to the source UPF, and initiates a transfer of the first PDU session from the source gNB to the target gNB. This corresponds to step 210 of the first embodiment and 308 of the second embodiment. In step 29, the SMF sends a session modification request to the target UPF, and initiates a transfer of the second PDU session from the source gNB to the target gNB. This corresponds to step 208 of the first embodiment and step 306 of the second embodiment. In step 31, the AS or the WD moves remaining flows from the first PDU session to the second PDU session. This corresponds to step 216 of the first embodiment, step 314 of the second embodiment and step 410 of the third embodiment. In step 32, the WD releases the first PDU session, which may be prompted by an instruction to do so by the SMF. This corresponds to step 218 of the first embodiment, and step 316 of the second embodiment.

Figure 8:
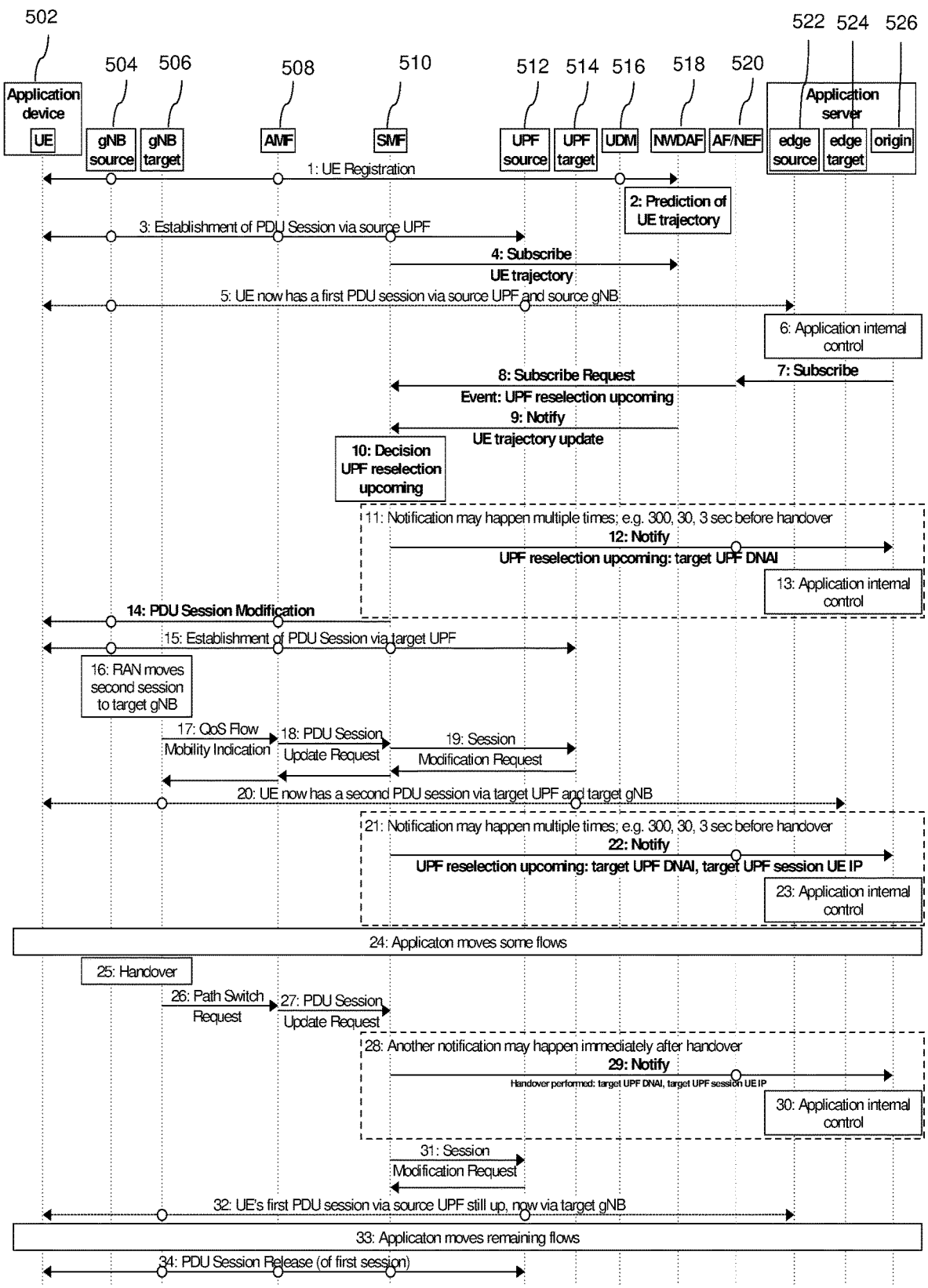
FIG. 8 is a signaling diagram illustrating different embodiments of procedures according to further possible embodiments.

FIG. 8 shows another signaling diagram, showing optional embodiments of the first, second and third embodiments. Steps 1-15 are the same as in FIG. 7, and the differing steps will now be elaborated upon. In the embodiment of FIG. 8, the WD is further connected to the target gNB as well. In step 16, the second PDU session is established via the second gNB, rather than via the first gNB as in FIG. 7, which also corresponds to an alternate version of step 206 of the first embodiment. In some embodiments, step 16 comprises triggering establishing resources for the second PDU session directly in the target gNB, wherein the establishing of the second PDU session is done by the WD. In some embodiments, step 16 comprises triggering establishing resource for the second PDU session in the source gNB, and subsequently moving the second PDU session from the source gNB to the target gNB. In such an embodiment, step 15 would further entail an instruction from the core network node to the first and/or second gNB that the second PDU session should be moved or established in the gNB which is most suitable for data transmission between the WD and the AS, for the new future position of the WD. In some embodiments, the information regarding that the second PDU session should be moved or established in the gNB which is most suitable for data transmission between the WD and the AS may be sent to the first and/or second gNB via another channel, such as via the O&M interface. The remaining steps of FIG. 8 are performed in the same manner as the corresponding steps of FIG. 7, with the exception that the first PDU session is not transferred from the source gNB to the target gNB.

Figure 9:
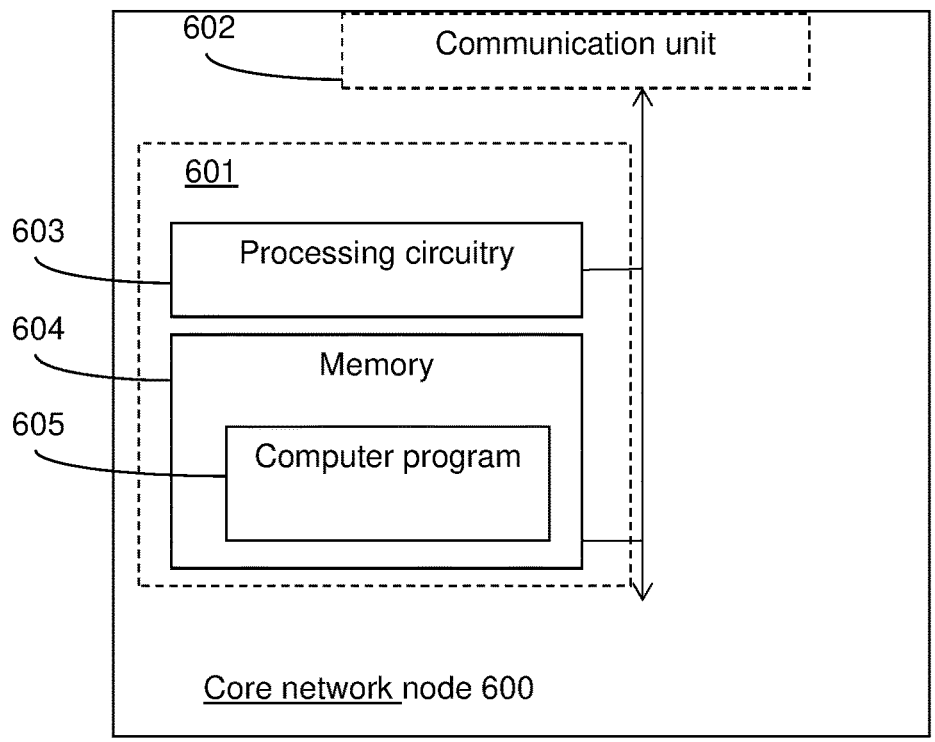
FIG. 9 is a block diagram illustrating a core network node in more detail, according to further possible embodiments.

FIG. 9, in conjunction with FIG. 2, shows a core network node 600, operable in a wireless communications network. In some embodiments, the core network node 600 may be a SMF core network node. The wireless communications network 100 comprises a first gNB 124 and a second gNB 134, wherein a wireless device, WD 150, is connected to the first gNB 124, and wherein there is a first Packet Data Unit, PDU, session established between the WD 150 and a Data Network, DN 140, over a first User Plane Function, UPF 122, the DN 135 comprising an application server, AS 140. The core network node 600 comprises processing circuitry 603 and a memory 604. The processing circuitry 603 may comprise one or more programmable processor, application-specific integrated circuits, field programmable gate arrays or combinations of these (not shown) adapted to execute instructions. The memory contains instructions executable by said processing circuitry, whereby the core network node 600 is operative for obtaining information regarding a predicted positional change of the WD 150 indicating a new future position of the WD, and selecting a second UPF which is more suitable than the first UPF 122 for transmission of data between the application server and the WD 150 for the new future position. The core network node 600 is further operative for triggering establishment of the second PDU session over the second UPF and in response to the triggering establishment of the second PDU session over the second UPF, triggering a first move of packet flows from the first PDU session to the second PDU session.

The core network node 600 of the wireless communications network that performs the method may be a group of network nodes, wherein functionality for performing the method are spread out over different physical, or virtual, nodes of the network. In other words, the core network node 600 may be a cloud-solution, i.e. the core network node 600 may be deployed as cloud computing resources that may be distributed in the network.

According to an embodiment, the core network node 600 is further operative for receiving a handover indication, and based on the receiving a handover indication, triggering a second move of packet flows from the first PDU session to the second PDU session.

According to an embodiment, the triggering establishment of the second PDU session over the second UPF comprises instructing the WD 150 to trigger establishment of the second PDU session over the second UPF.

According to an embodiment the triggering establishment of the second PDU session over the second UPF comprises triggering establishment of the second PDU session over the second UPF via the second gNB 134.

According to an embodiment the triggering establishment of the second PDU session over the second UPF via the second gNB 134 comprises triggering establishment of the second PDU session over the second UPF via the first gNB 124, and the core network node 600 is further operative for, in response to the establishment of the second PDU session over the second UPF via the first gNB 124, facilitating (208) a transfer of the second PDU session over the second UPF from the first gNB 124 to the second gNB 134.

According to an embodiment wherein the first PDU session over the first UPF 122 is via the first gNB, the core network node 600 is further operative for facilitating (210) a transfer of the first PDU session over the first UPF 122 from the first gNB to the second gNB.

According to an embodiment the triggering establishment of a second PDU session over the second UPF comprises indicating that the second PDU session over the second UPF should be via the gNB which provides a shortest packet transmission latency based on the predicted new position of the WD 150.

According to an embodiment the triggering a move of packet flow from the first PDU session over the first UPF 122 to the second PDU session over the second UPF comprises instructing the AS or the WD 150 to trigger the move of packet flow from the first PDU session to the second PDU session.

According to an embodiment the obtaining information regarding a predicted positional change of the WD 150 is based on a positional change of the WD 150 related to a predetermined area.

According to an embodiment the information regarding a predicted positional change of the WD 150 comprises an ID of the WD 150 and an estimated time of arrival of the WD 150 at a position indicated in the information regarding a predicted positional change of the WD 150.

According to an embodiment the information regarding a predicted positional change of the WD 150 is obtained a predetermined time before the positional change is predicted to take place.

According to an embodiment the core network node 600 is further operative for notifying the AS regarding the upcoming change of UPF, prior to the triggering establishment of a second PDU session over the second UPF.

According to an embodiment the core network node 600 is further operative for triggering a release of the first PDU session over the first UPF 122.

According to other embodiments, the core network node 600 may further comprise a communication unit 602, which may be considered to comprise conventional means for communicating with a WD and with a wireless communications network. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in a core network node 600 causes the core network node 600 to perform the steps described in any of the described embodiments of the core network node 600. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the core network node 600 or to which the core network node 600 has access via the communication unit 602. The computer program may then be downloaded from the server into the memory 604.

Figure 10:
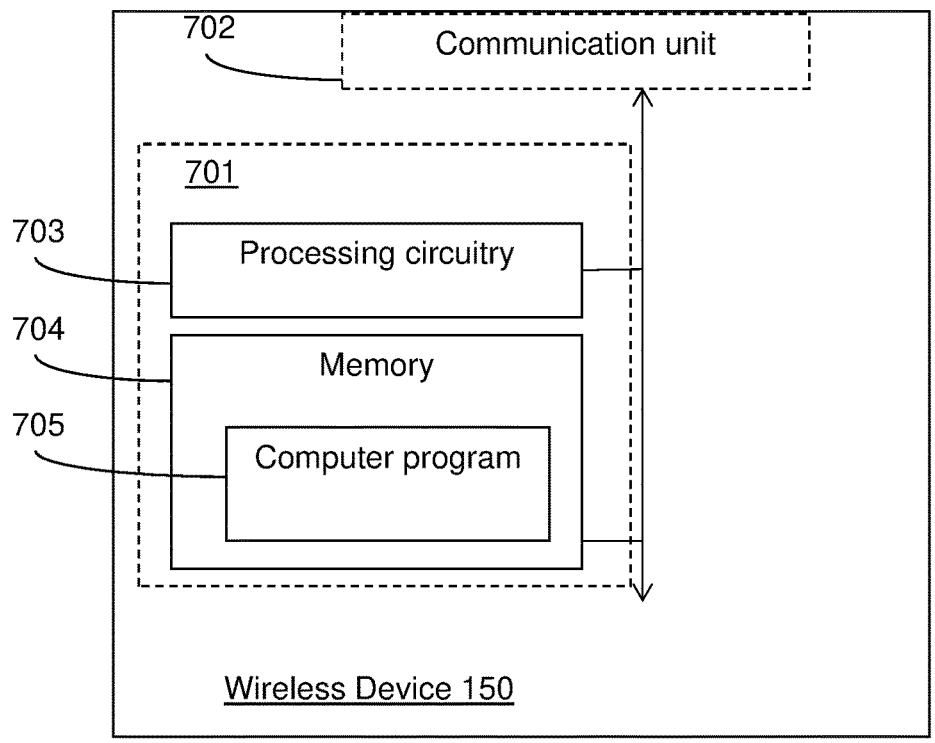
FIG. 10 is a block diagram illustrating a wireless device in more detail, according to further possible embodiments.

FIG. 10, in conjunction with FIG. 2, shows a wireless device, WD 150, operable for wireless communication with a wireless communications network. The wireless communications network 100 comprises a core network node 600, a first gNB 124 and a second gNB 134, wherein the WD 150 is operative for being connected to the first gNB 124, and wherein the WD is operative for having a first Packet Data Unit, PDU, session established between the WD 150 and a Data Network, DN 140, over a first User Plane Function, UPF 122, wherein the DN 135 comprises an application server, AS 140. The WD 150 comprises processing circuitry 703 and a memory 704. The processing circuitry 703 may comprise one or more programmable processor, application-specific integrated circuits, field programmable gate arrays or combinations of these (not shown) adapted to execute instructions. The memory contains instructions executable by said processing circuitry, whereby the WD 150 is operative for receiving an instruction to establish a second PDU session between the WD 150 and the DN over a second UPF, wherein the instruction is received in response to a predicted positional change of the WD 150 indicating a new future position in which the second UPF is more suitable than the first UPF 122 for transmission of data between the AS and the WD 150. The WD 150 is further operative for, in response to the receiving, establishing the second PDU session over the second UPF between the WD 150 and the DN 135, and in response to the establishing the second PDU session over the second UPF between the WD 150 and the DN 135, initiating a first move of packet flows from the first PDU session over the first UPF 122 to the second PDU session over the second UPF.

According to an embodiment, the WD is further operative for receiving indication of a handover of the WD 150, and based on the receiving indication of a handover, initiating a second move of packet flows from the first PDU session to the second PDU session.

According to an embodiment, the establishing the second PDU session over the second UPF comprises establishing the second PDU session over the second UPF via the second gNB 134.

According to an embodiment, the establishing the second PDU session over the second UPF via the second gNB 134 comprises establishing the second PDU session over the second UPF via the first gNB 124, and wherein the WD 150 is further operative for, in response to the establishing the second PDU session over the second UPF via the first gNB 124, transferring the second PDU session from the first gNB 124 to the second gNB 134.

According to an embodiment, the WD is further operative for, in response to the establishing the second PDU session over the second UPF via the first gNB 124, transferring the first PDU session from the first gNB 124 to the second gNB 134.

According to an embodiment, the instruction to establish a second PDU session over the second UPF between the WD 150 and the application server is received a predetermined amount of time before the second PDU session over the second UPF should be established.

According to an embodiment, the WD is further operative for releasing the first PDU session.

According to other embodiments, the WD 150 may further comprise a communication unit 702, which may be considered to comprise conventional means for communicating with a WD and with a wireless communications network. The instructions executable by said processing circuitry 703 may be arranged as a computer program 705 stored e.g. in the memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above.

The computer program 705 may comprise computer readable code means, which when run in a WD 150 causes the WD 150 to perform the steps described in any of the described embodiments of the WD 150. The computer program 705 may be carried by a computer program product connectable to the processing circuitry 703. The computer program product may be the memory 704. The memory 704 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 704. Alternatively, the computer program may be stored on a server or any other entity connected to the core network node 700 or to which the core network node 700 has access via the communication unit 702. The computer program may then be downloaded from the server into the memory 704.

Figure 11:
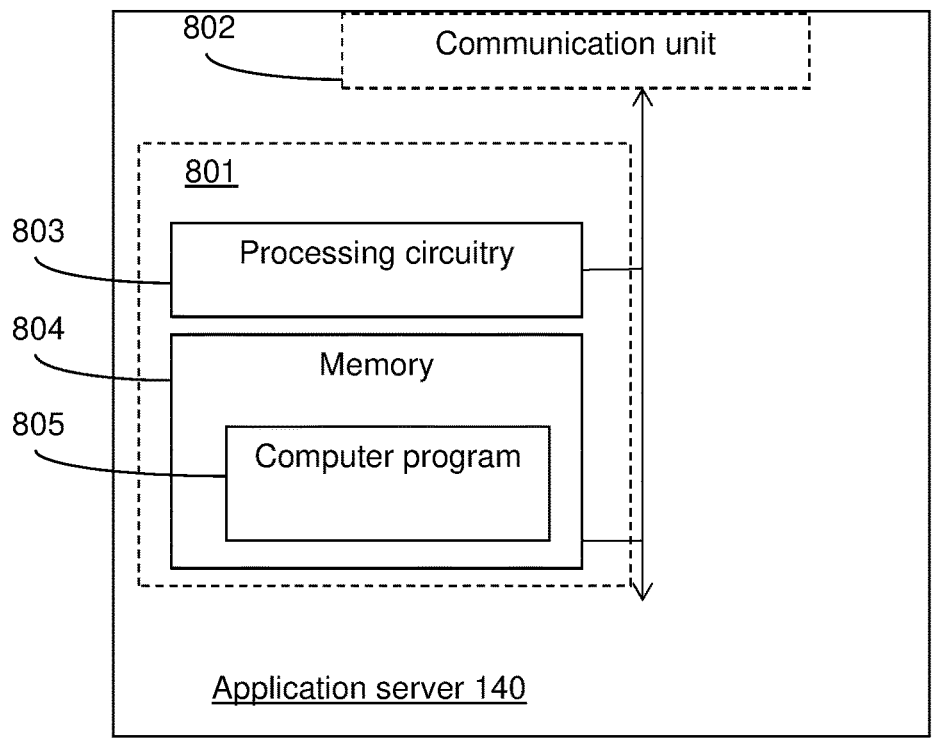
FIG. 11 is a block diagram illustrating an application server in more detail, according to further possible embodiments.

FIG. 11, in conjunction with FIG. 2, shows an application server, AS 140, operable in a wireless communications network. The wireless communications network 100 comprises a core network node 800, a first gNB 124 and a second gNB 134, wherein a WD 150 is connected to the first gNB 124, and wherein the WD has a first Packet Data Unit, PDU, session established between the WD 150 and a Data Network, DN 140, over a first User Plane Function, UPF 122, wherein the DN 135 contains the AS 140. The AS 140 comprises processing circuitry 803 and a memory 804. The processing circuitry 803 may comprise one or more programmable processor, application-specific integrated circuits, field programmable gate arrays or combinations of these (not shown) adapted to execute instructions. The memory contains instructions executable by said processing circuitry, whereby the AS 140 is operative for subscribing to information regarding predicted positional changes of the WD 150 and receiving an indication that a second PDU session has been established between the DN 135 and the WD 150 over the second UPF, wherein the second PDU session is received in response to a predicted positional change of the WD 150 indicating a new future position in which the second UPF is more suitable than the first UPF 122 for transmission of data between the AS and the WD 150. The AS 140 is further operative for, in response to the receiving an indication that a second PDU session has been established between the DN 135 and the WD 150 over the second UPF, initiating a first move of packet flows from the first PDU session over the first UPF 122 to the second PDU session over the second UPF.

According to an embodiment, the AS 140 is further operative for receiving indication of a handover of the WD 150, and based on receiving the indication of handover, initiating a second move of packet flows from the first PDU session to the second PDU session.

According to an embodiment, the AS 140 is further operative for receiving a notification regarding the upcoming change of UPF, prior to receiving the second PDU session over the second UPF.

According to other embodiments, the AS 140 may further comprise a communication unit 802, which may be considered to comprise conventional means for communicating with a WD and with a wireless communications network. The instructions executable by said processing circuitry 803 may be arranged as a computer program 805 stored e.g. in the memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above.

The computer program 805 may comprise computer readable code means, which when run in an AS 140 causes the AS 140 to perform the steps described in any of the described embodiments of the AS 140. The computer program 805 may be carried by a computer program product connectable to the processing circuitry 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the AS 140 or to which the AS 140 has access via the communication unit 802. The computer program may then be downloaded from the server into the memory 804.

Figure 12:
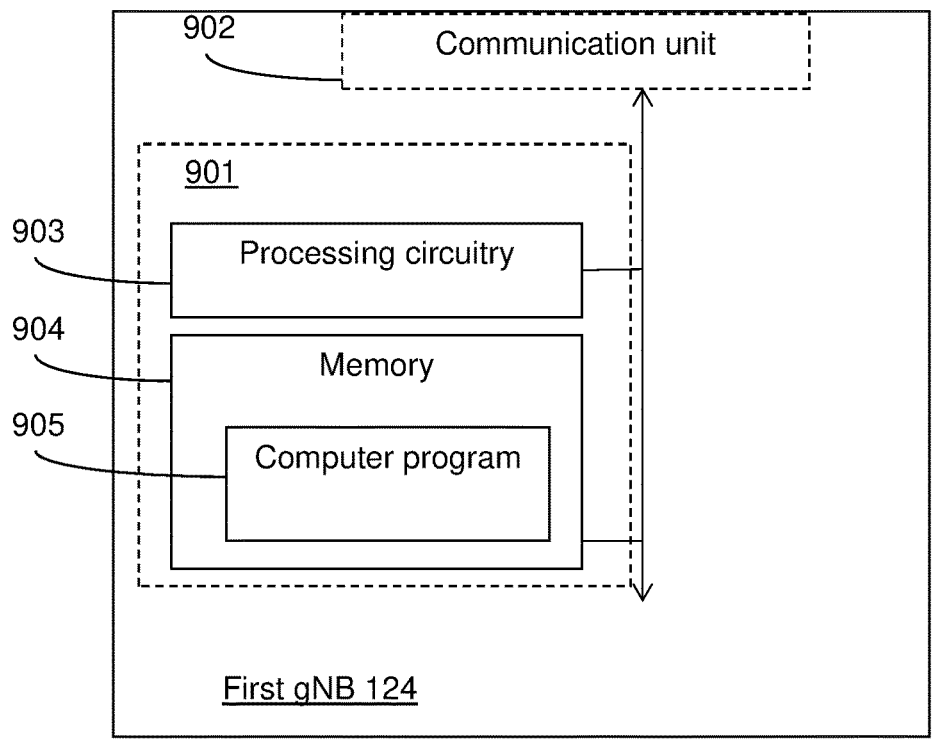
FIG. 12 is a block diagram illustrating a first base station, preferably a first gNB, in more detail, according to further possible embodiments.

FIG. 12, in conjunction with FIG. 2, shows a base station, preferably a first gNB 124, operable in a wireless communications network. The wireless communications network 100 further comprises a core network node 600, and a second gNB 134, wherein a WD 150 is operative for being connected to the first gNB 124, and wherein the WD is operative for having a first Packet Data Unit, PDU, session established between the WD 150 and a Data Network, DN 140, over a first User Plane Function, UPF 122, wherein the DN 135 comprises an application server, AS 140. The WD 150 comprises processing circuitry 903 and a memory 904. The processing circuitry 903 may comprise one or more programmable processor, application-specific integrated circuits, field programmable gate arrays or combinations of these (not shown) adapted to execute instructions. The memory contains instructions executable by said processing circuitry, whereby the gNB 124 is operative for receiving an indication that the second gNB 134 is more suitable than the first gNB 124 for establishing a second PDU session over the second UPF in a predicted new position of the WD 150, receiving a request for establishing a second PDU session over the second UPF based on the predicted new position of the WD 150, and based on the received indication and the received request, ensuring that the second PDU session is established via the second gNB 134.

According to other embodiments, the first gNB 124 may further comprise a communication unit 902, which may be considered to comprise conventional means for communicating with a WD and with a wireless communications network. The instructions executable by said processing circuitry 903 may be arranged as a computer program 905 stored e.g. in the memory 904. The processing circuitry 903 and the memory 904 may be arranged in a sub-arrangement 901. The sub-arrangement 901 may be a micro-processor and adequate software and storage therefore, a Programmable Logic Device, PLD, or other electronic component(s)/processing circuit(s) configured to perform the methods mentioned above.

The computer program 905 may comprise computer readable code means, which when run in a first gNB 124 causes the first gNB 124 to perform the steps described in any of the described embodiments of the first gNB 124. The computer program 905 may be carried by a computer program product connectable to the processing circuitry 903. The computer program product may be the memory 904. The memory 904 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 904. Alternatively, the computer program may be stored on a server or any other entity connected to the core network node 900 or to which the first gNB 124 has access via the communication unit 902. The computer program may then be downloaded from the server into the memory 904.

Figure 13:
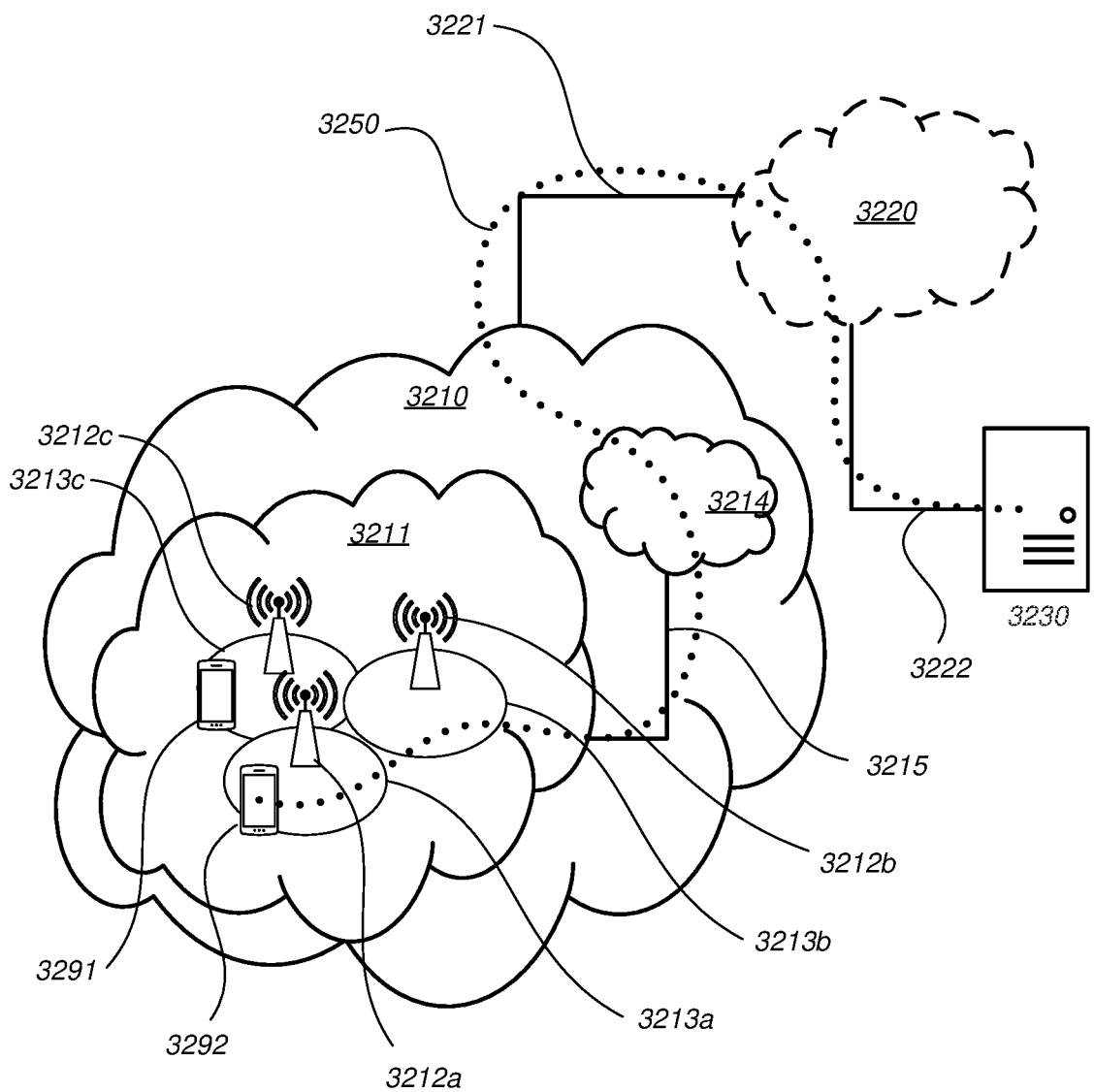
FIG. 13 schematically illustrates a telecommunication network connected via an intermediate network to a host computer.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 33. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 33) served by the base station 3320. The communication interface 3326 may be configured to facilitate a connection 3360 to the host computer 3310. The connection 3360 may be direct or it may pass through a core network (not shown in FIG. 33) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 33 may be identical to the host computer 3230, one of the base stations 3212a, 3212b, 3212c and one of the UEs 3291, 3292 of FIG. 32, respectively. This is to say, the inner workings of these entities may be as shown in FIG. 33 and independently, the surrounding network topology may be that of FIG. 32.

Figure 14:
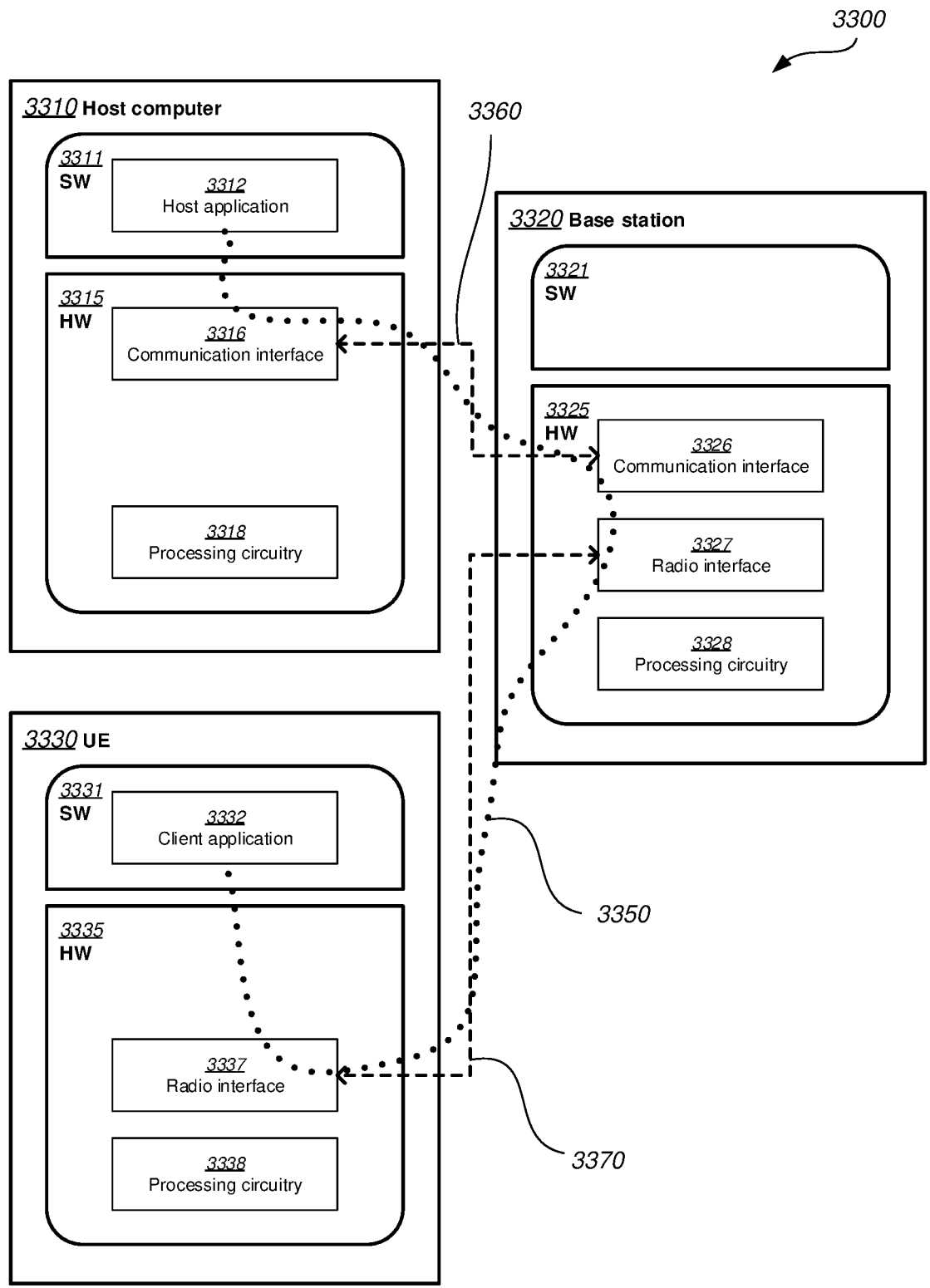
FIG. 14 is a generalized block diagram of a host computer communicating via a wireless network node with a wireless device over a partially wireless connection.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and latency, and thereby provide effects such as reduced user waiting time and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 35 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 17 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 36 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 37 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

More possible embodiments will now be described. Embodiments DS5-DS36 represent a downstream aspect of the radio-related invention, and embodiments US45-US77 represent an upstream aspect of the radio-related invention. In addition to the embodiments described below, optional embodiments similar to the embodiments for core network node of FIG. 9, the WD of FIG. 10, the AS of FIG. 11 and the gNB of FIG. 12, may also be applicable to the below described embodiments. The base station referenced above in reference to FIGS. 9-14 and in the embodiments below may be the first gNB 124 of the fourth embodiment. The numbered embodiments below may be implemented in wireless communications networks similar to the ones described in relation to aspects of the invention. For example, the wireless communications network may comprise a first gNB, a second gNB, a first UPF, a second UPF, a DN containing an AS, wherein a WD is connected to the first gNB and possibly to the second gNB. The term user equipment, UE, is used interchangeably with WD below and in FIGS. 13-18.

Numbered Embodiments

5. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured for:
receiving a request for establishing a second PDU session over a second UPF, based on a predicted new position of the WD;
obtaining an indication that the second PDU session should be established via the most suitable gNB for the second UPF; and
based on the received indication and the received request, ensuring that the second PDU session is established via the second gNB.
  6. The communication system of embodiment 5, further including the base station.
  7. The communication system of embodiment 6, further including the UE, wherein the UE is configured to communicate with the base station.
  8. The communication system of embodiment 7, wherein:
the processing circuitry of the host computer is configured to execute a host application, thereby providing the user data; and
the UE comprises processing circuitry configured to execute a client application associated with the host application.
    15. A method implemented in a communication system including a host computer,
a base station and a user equipment (UE), the method comprising
at the host computer, providing user data; and
at the host computer, initiating a transmission carrying the user data to the UE via a cellular network comprising the base station, wherein the base station
receives a request for establishing a second PDU session over a second UPF, based on a predicted new position of the WD;
obtains an indication that the second PDU session should be established via the most suitable gNB for the second UPF; and
based on the received indication and the received request, ensures that the second PDU session is established via the second gNB.
    16. The method of embodiment 15, further comprising: at the base station, transmitting the user data.
    17. The method of embodiment 16, wherein the user data is provided at the host computer by executing a host application, the method further comprising:
at the UE, executing a client application associated with the host application.
    25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured for receiving an instruction to establish a second PDU session between the WD and the DN over a second UPF, wherein the instruction is received in response to a predicted positional change of the WD indicating a new future position in which the second UPF is more suitable than the first UPF for transmission of data between the AS and the WD;
in response to the receiving, establishing the second PDU session over the second UPF between the WD and the DN; and
in response to the establishing the second PDU session over the second UPF between the WD and the DN, initiating a first move of packet flows from the first PDU session over the first UPF to the second PDU session over the second UPF.
    26. The communication system of embodiment 25, further including the UE.
    27. The communication system of embodiment 26, wherein the cellular network further includes a base station configured to communicate with the UE.
    28. The communication system of embodiment 26 or 27, wherein:
the processing circuitry of the host computer is configured to execute a host application, thereby providing the user data; and
the UE's processing circuitry is configured to execute a client application associated with the host application.
    35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE
receives an instruction to establish a second PDU session between the WD and the DN over a second UPF, wherein the instruction is received in response to a predicted positional change of the WD indicating a new future position in which the second UPF is more suitable than the first UPF for transmission of data between the AS and the WD;
in response to the receiving, establishes the second PDU session over the second UPF between the WD and the DN; and
in response to establishing the second PDU session over the second UPF between the WD and the DN, initiates a first move of packet flows from the first PDU session over the first UPF to the second PDU session over the second UPF.

36. The method of embodiment 35, further comprising: at the UE, receiving the user data from the base station.

. . .

45. A communication system including a host computer comprising:
a communication interface configured to receive user data originating from a transmission from a user equipment (UE) to a base station,
wherein the UE comprises a radio interface and processing circuitry, the UE's processing circuitry configured for:
receiving an instruction to establish a second PDU session between the WD and the DN over a second UPF, wherein the instruction is received in response to a predicted positional change of the WD indicating a new future position in which the second UPF is more suitable than the first UPF for transmission of data between the AS and the WD;
in response to the receiving, establishing the second PDU session over the second UPF between the WD and the DN; and
in response to the establishing the second PDU session over the second UPF between the WD and the DN, initiating a first move of packet flows from the first PDU session over the first UPF to the second PDU session over the second UPF.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

55. A method implemented in a communication system including a host computer, a base station and a user equipment (UE), the method comprising:
at the host computer, receiving user data transmitted to the base station from the UE, wherein the UE receives an instruction to establish a second PDU session between the WD and the DN over a second UPF, wherein the instruction is received in response to a predicted positional change of the WD indicating a new future position in which the second UPF is more suitable than the first UPF for transmission of data between the AS and the WD;
in response to the receiving, establishes the second PDU session over the second UPF between the WD and the DN; and
in response to establishing the second PDU session over the second UPF between the WD and the DN, initiates a first move of packet flows from the first PDU session over the first UPF to the second PDU session over the second UPF.

56. The method of embodiment 55, further comprising: at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

65. A communication system including a host computer comprising a communication interface configured to receive user data originating from a transmission from a user equipment (UE) to a base station, wherein the base station comprises a radio interface and processing circuitry, the base station's processing circuitry configured for
receiving a request for establishing a second PDU session over a second UPF, based on a predicted new position of the WD;
obtaining an indication that the second PDU session should be established via the most suitable gNB for the second UPF; and
based on the received indication and the received request, ensuring that the second PDU session is established via the second gNB.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

75. A method implemented in a communication system including a host computer, a base station and a user equipment (UE), the method comprising:
at the host computer, receiving, from the base station, user data originating from a transmission which the base station has received from the UE, wherein the base station:
receives a request for establishing a second PDU session over a second UPF, based on a predicted new position of the WD;
obtains an indication that the second PDU session should be established via the most suitable gNB for the second UPF; and
based on the received indication and the received request, ensures that the second PDU session is established via the second gNB.

76. The method of embodiment 75, further comprising: at the base station, receiving the user data from the UE.

77. The method of embodiment 76, further comprising:
at the base station, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method, performed by a core network node of a wireless communications network, the wireless communications network further comprising a first gNB and a second gNB, a wireless device, WD, is connected to the first gNB, and there is a first Packet Data Unit, PDU, session established between the WD and a Data Network, DN, over a first User Plane Function, UPF, the DN comprising an application server, AS, the method comprising:
  obtaining information regarding a predicted positional change of the WD indicating a new future position of the WD;
  selecting a second UPF which is more suitable than the first UPF for transmission of data between the application server and the WD for the new future position;
  triggering establishment of the second PDU session over the second UPF, the triggering establishment of the second PDU session over the second UPF including triggering establishment of the second PDU session over the second UPF via the second qNB, the triggering establishment of the second PDU session over the second UPF via the second qNB including triggering establishment of the second PDU session over the second UPF via the first gNB;
  in response to the establishment of the second PDU session over the second UPF via the first qNB, facilitating a transfer of the second PDU session over the second UPF from the first qNB to the second gNB; and
  in response to the triggering establishment of the second PDU session over the second UPF, triggering a first move of packet flows from the first PDU session to the second PDU session.

2. The method according to claim 1, further comprising: receiving a handover indication; and
  based on the receiving a handover indication, triggering a second move of packet flows from the first PDU session to the second PDU session.

3. The method according to claim 1, wherein the triggering establishment of the second PDU session over the second UPF comprises instructing the WD to trigger establishment of the second PDU session over the second UPF.

4. The method according to claim 1, wherein the first PDU session over the first UPF is via the first gNB, the method further comprising:
  facilitating a transfer of the first PDU session over the first UPF from the first gNB to the second gNB.

5. The method according to claim 1, wherein the triggering establishment of a second PDU session over the second UPF comprises indicating that the second PDU session over the second UPF should be via the gNB which provides a shortest packet transmission latency based on the predicted new position of the WD.

6. A method, performed by a Wireless Device, WD, connected to a wireless communications network, the wireless communications network comprising a core network node, a first gNB and a second gNB, the WD is connected to the first gNB, and there is a first Packet Data Unit, PDU, session established between the WD and a Data Network, DN, over a first User Plane Function, UPF, the DN comprising an application server, AS, the PDU session enabling transmission of data between the WD and the AS, the method comprising:
  receiving an instruction to establish a second PDU session between the WD and the DN over a second UPF, the instruction being received in response to a predicted positional change of the WD indicating a new future position in which the second UPF is more suitable than the first UPF for transmission of data between the AS and the WD;
  in response to the receiving, establishing the second PDU session over the second UPF between the WD and the DN, the establishing the second PDU session over the second UPF including establishing the second PDU session over the second UPF via the second qNB, the establishing the second PDU session over the second UPF via the second qNB including establishing the second PDU session over the second UPF via the first gNB;
  in response to the establishing the second PDU session over the second UPF via the first qNB, transferring the second PDU session from the first qNB to the second gNB; and
  in response to the establishing (304) the second PDU session over the second UPF between the WD and the DN, initiating a first move of packet flows from the first PDU session over the first UPF to the second PDU session over the second UPF.

7. The method according to claim 6, further comprising: receiving indication of a handover of the WD; and
  based on the receiving indication of a handover, initiating a second move of packet flows from the first PDU session to the second PDU session.

8. The method according to claim 6, further comprising:
  in response to the establishing the second PDU session over the second UPF via the first gNB, transferring the first PDU session from the first gNB to the second gNB.

9. A method, performed by a first gNB of a wireless communications network, the wireless communications network further comprising a core network node and a second gNB, a WD is connected to the first gNB, and there is a first Packet Data Unit, PDU, session established between the WD and a Data Network, DN, over a first User Plane Function, UPF, the DN comprising the AS, the PDU session enabling transmission of data between the WD and the AS, the method comprising:
  receiving a request for establishing a second PDU session over a second UPF, based on a predicted new position of the WD;
  obtaining an indication that the second PDU session should be established via the most suitable gNB for the second UPF, the indication including an indication that the second PDU session should be via the qNB that has the shortest packet transmission delay for the predicted new position; and
  based on the received indication and the received request, ensuring that the second PDU session is established via the second gNB.

10. The method according to claim 9, wherein the method further comprises:
selecting the second gNB as the most suitable gNB for establishing the second PDU session over the second UPF.

11. The method according to claim 9, wherein the indication comprises an indication that the second PDU session should be established via the second gNB.

12. A core network node operable in a wireless communications network, the wireless communications network comprising a first gNB and a second gNB, a wireless device, WD, is connected to the first gNB, and there is a first Packet Data Unit, PDU, session established between the WD and a Data Network, DN, over a first User Plane Function, UPF, the DN comprising an application server, the core network node comprising:
processing circuitry; and
a memory, the memory containing instructions executable by the processing circuitry, to configure the core network node for:
obtaining information regarding a predicted positional change of the WD indicating a new future position of the WD;
selecting a second UPF which is more suitable than the first UPF for transmission of data between the application server and the WD for the new future position;
triggering establishment of the second PDU session over the second UPF, the triggering establishment of the second PDU session over the second UPF including triggering establishment of the second PDU session over the second UPF via the second qNB, the triggering establishment of the second PDU session over the second UPF via the second qNB including triggering establishment of the second PDU session over the second UPF via the first gNB;
in response to the establishment of the second PDU session over the second UPF via the first qNB, facilitating a transfer of the second PDU session over the second UPF from the first qNB to the second gNB; and
in response to the triggering establishment of the second PDU session over the second UPF, triggering a first move of packet flows from the first PDU session to the second PDU session.

13. A wireless device, WD, operable for communication with a wireless communications network, the wireless communications network comprising a core network node, a first gNB and a second gNB, the WD is operable to be connected to the first gNB, and operable to have a first Packet Data Unit, PDU, session established between the WD and a Data Network, DN, over a first User Plane Function, UPF, the DN comprising an application server, AS, the PDU session enabling transmission of data between the WD and the AS, the WD comprising:
processing circuitry; and
a memory, the memory containing instructions executable by the processing circuitry, to configured the wireless device for:
receiving an instruction to establish a second PDU session between the WD and the DN over a second UPF, the instruction being received in response to a predicted positional change of the WD indicating a new future position in which the second UPF is more suitable than the first UPF for transmission of data between the AS and the WD;
in response to the receiving, establishing the second PDU session over the second UPF between the WD and the DN, the establishing the second PDU session over the second UPF including establishing the second PDU session over the second UPF via the second qNB, the establishing the second PDU session over the second UPF via the second qNB including establishing the second PDU session over the second UPF via the first gNB;
in response to the establishing the second PDU session over the second UPF via the first qNB, transferring the second PDU session from the first qNB to the second gNB; and
in response to the establishing the second PDU session over the second UPF between the WD and the DN, initiating a first move of packet flows from the first PDU session over the first UPF to the second PDU session over the second UPF.

14. A first gNB operable in a wireless communications network, the wireless communications network further comprising a core network node and a second gNB, the first gNB is operable to have a connection to a WD, and the first gNB is operable to have a first Packet Data Unit, PDU, session established between the WD and a Data Network, DN, over a first User Plane Function, UPF, the DN comprising the AS, the PDU session enabling transmission of data between the WD and the AS, the first gNB comprising:
processing circuitry; and
a memory, the memory containing instructions executable by the processing circuitry to configured the first gNB for:
receiving a request for establishing a second PDU session over a second UPF, based on a predicted new position of the WD;
obtaining an indication that the second PDU session should be established via the most suitable gNB for the second UPF, the indication including an indication that the second PDU session should be via the qNB that has the shortest packet transmission delay for the predicted new position; and
based on the received indication and the received request, ensuring that the second PDU session is established via the second gNB.

* * * * *